United States Patent
Kawai et al.

(10) Patent No.: US 9,189,710 B2
(45) Date of Patent: Nov. 17, 2015

(54) RECORDED MATTER PRODUCING APPARATUS

(71) Applicant: Brother Kogyo Kabushiki Kaisha, Nagoya-shi, Aichi-ken (JP)

(72) Inventors: Junya Kawai, Nagoya (JP); Naoki Tanjima, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/502,496

(22) Filed: Sep. 30, 2014

(65) Prior Publication Data
US 2015/0092202 A1 Apr. 2, 2015

(30) Foreign Application Priority Data
Sep. 30, 2013 (JP) .................................. 2013-204520

(51) Int. Cl.
*G06K 15/02* (2006.01)
*G06K 15/00* (2006.01)
*B41J 3/407* (2006.01)

(52) U.S. Cl.
CPC .......... *G06K 15/022* (2013.01); *G06K 15/1868* (2013.01); *G06K 15/404* (2013.01); *G06K 15/4065* (2013.01); *B41J 3/4075* (2013.01)

(58) Field of Classification Search
None
See application file for complete search history.

(56) References Cited

U.S. PATENT DOCUMENTS

| 5,131,772 A | 7/1992 | Yamaguchi |
| RE35,175 E | 3/1996 | Yamaguchi |
| 7,503,711 B2 * | 3/2009 | Arkin .............................. 400/76 |
| 7,766,570 B2 * | 8/2010 | Moriyama et al. ............ 400/621 |
| 8,430,586 B2 * | 4/2013 | Watanabe ..................... 400/583 |
| 2008/0199235 A1 * | 8/2008 | Shoji et al. .................... 399/364 |

FOREIGN PATENT DOCUMENTS

| EP | 0475767 A2 | 3/1992 |
| JP | 3072273 U | 10/2000 |
| JP | 2007-171379 A | 7/2007 |

OTHER PUBLICATIONS

Feb. 4, 2015—(EP) Extended Search Report—App 14186929.7.

* cited by examiner

*Primary Examiner* — Allen H Nguyen
(74) *Attorney, Agent, or Firm* — Banner & Witcoff, Ltd.

(57) ABSTRACT

The disclosure discloses a recorded matter producing apparatus comprising a data acquisition portion and an end adjusting portion. A printing head performs printing on a medium to be recorded and produce recorded matter where desired print based on print data is formed. The data acquisition portion acquires unit print data for periodically performing print formation per data print area and total length data. The data print area comprises a predetermined unit length. The total length data indicates a total length of a recorded matter print area on which a unit image corresponding to the unit print data is periodically printed. The end adjusting portion makes adjustments so as to match an end position both of the recorded matter print area and the data print area where the unit image is formed in a last sequence, by either print data mode adjustment or total length data adjustment.

13 Claims, 24 Drawing Sheets

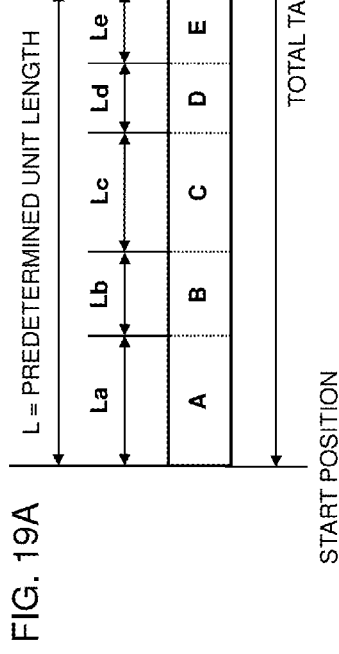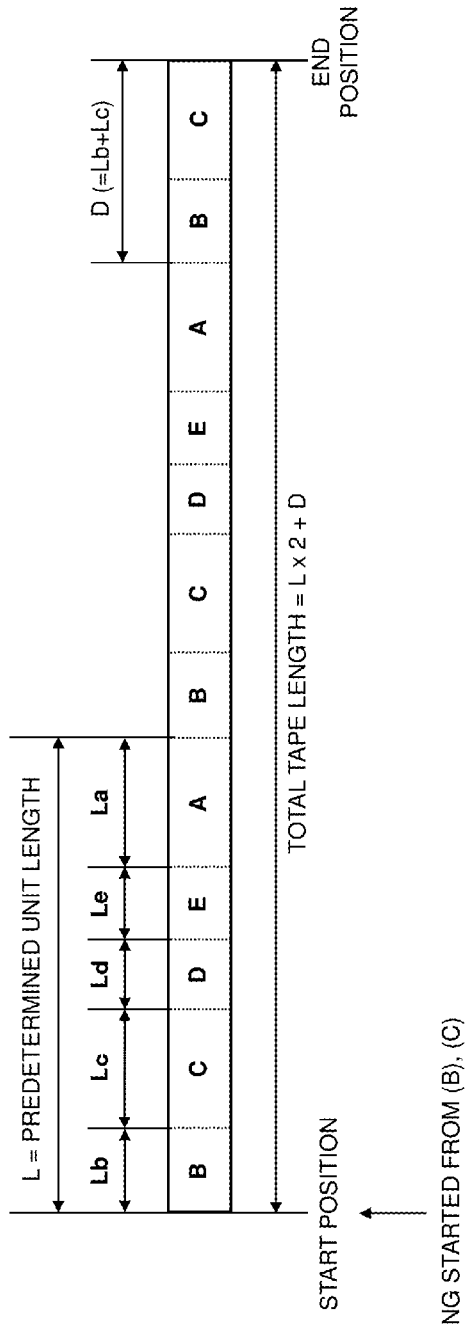
FIG. 19A
FIG. 19B

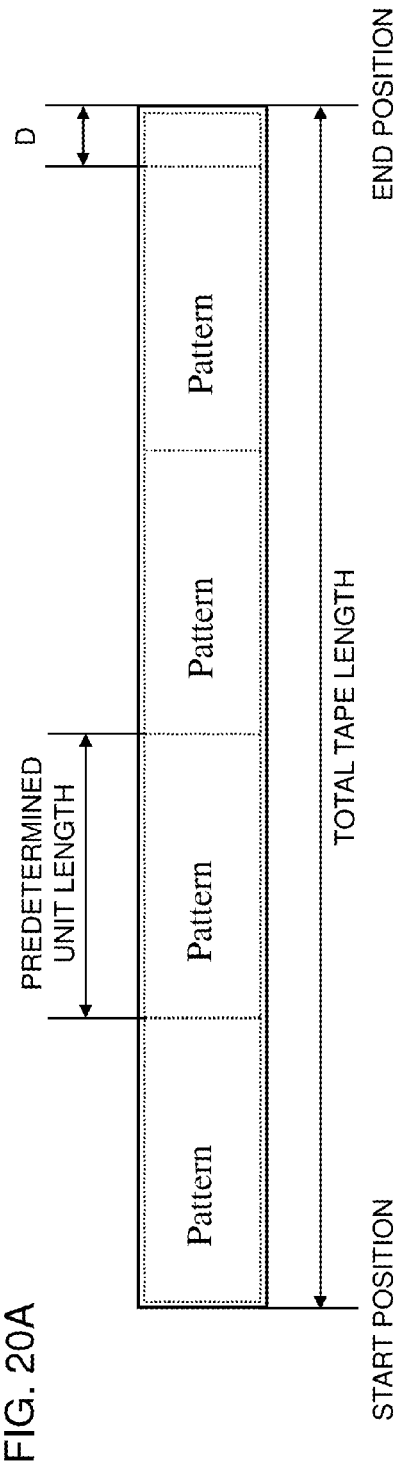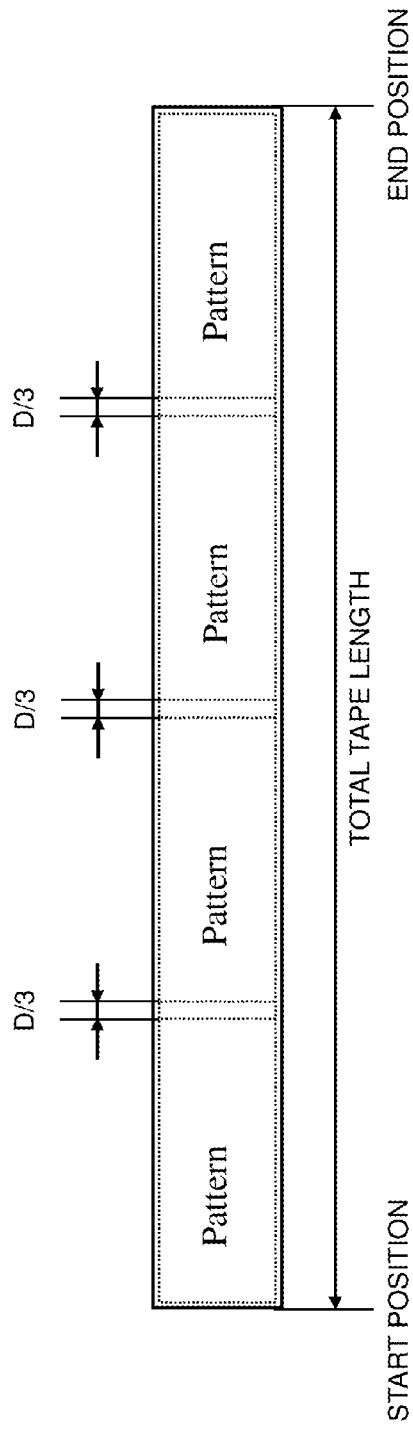

RECORDED MATTER PRODUCING APPARATUS

CROSS-REFERENCE TO RELATED APPLICATION

The present application claims priority from Japanese Patent Application No. 2013-204520, which was filed on Sep. 30, 2013, the disclosure of which is incorporated herein by reference in its entirety.

BACKGROUND

1. Field

The present disclosure relates to a recorded matter producing apparatus that repeatedly prints print data at a predetermined unit length with respect to a transport direction of a print-receiving medium.

2. Description of the Related Art

A technique that continuously repeatedly forms print of identical contents based on identical print data along a longitudinal direction on a surface of a wound tape wound in a cylindrical shape is disclosed.

In repeated printing that continuously repeatedly prints identical print contents such as that of the prior art described above, the print length of one print object is normally arbitrarily set by the user. On the other hand, the length of an entire tape on which a plurality of the print objects is formed by the repeated printing is also normally set to an arbitrary length by the user.

Nevertheless, in a case where the print length and the total tape length are each arbitrarily individually set as described above, the possibility exists that the total tape length will not be an integer multiple of the print length. In such a case, when a print object is repeatedly printed per the print length from the start of the tape, there is a high possibility that formation of one print object at the tape end position will end halfway. In particular, in a case where the tape with print is wound into a roll shape, the halfway formed print object stands out at the tape end positioned on the outer circumference, marring the aesthetics.

SUMMARY

An object of the present disclosure is to provide a recorded matter producing apparatus capable of improving the aesthetics of the tape end positioned on the outer circumference, even in a case where the printed tape is wound into a roll shape.

In order to achieve the above-described object, according to an aspect of the present disclosure, there is provided a recorded matter producing apparatus comprising a feeder configured to feed a medium to be recorded, a printing head configured to perform printing on the medium fed by the feeder based on print data and produce recorded matter where desired print based on the print data is formed on the medium along a transport direction of the feeder, a data acquisition portion configured to acquire unit print data for periodically performing print formation per data print area of the medium and total length data, the data print area comprising a predetermined unit length along the transport direction, the total length data indicating a total length of a recorded matter print area of the recorded matter on which a unit image corresponding to the unit print data is periodically printed along the transport direction, and an end adjusting portion configured to make adjustments so as to match an end position of the recorded matter print area along the transport direction and an end position of the data print area where the unit image is formed in a last sequence along the transport direction, by either print data mode adjustment that fixes the total length data and adjusts a print mode by the unit print data in the recorded matter print area, or total length data adjustment that fixes the predetermined unit length and adjusts the total length data.

When printing on a long print-receiving medium such as tape, the data amount becomes extensive if the print data is generated across the entire length thereof. Hence, the present disclosure proposes repeated printing that continuously repeatedly prints unit print data input at a predetermined unit length along the transport direction of the print-receiving medium.

In this repeated printing, the unit print data printed at the predetermined unit length is arbitrarily set by the user, and thus the predetermined unit length is also set to an arbitrary length. On the other hand, the length of the tape printed by the repeated printing is also separately set to an arbitrary length by the user.

Nevertheless, with the predetermined unit length and tape length each individually arbitrarily set as described above, the possibility that the tape length will be an integer multiple of the predetermined unit length is low. As a result, when the unit print data is repeatedly printed from the beginning of the tape length, the possibility that the print of the unit print data will end halfway at the end position of the tape length is high. In particular, when this tape with print is wound into a roll shape, the print of the halfway ended unit print data stands out since the tape end is positioned on the outer circumference.

Conversely, according to the present disclosure, the unit print data of a predetermined unit length and the total length data equivalent to the tape length are acquired by data acquisition portion. Then, end adjusting portion makes adjustments so as to match the end position of the recorded matter print area where the unit print data is periodically printed on the recorded matter, and the end position of the data print area of the unit print data lastly printed, by either print data mode adjustment or total length data adjustment. The print data mode adjustment is a technique that fixes the total length data and adjusts the print mode of the unit print data in the recorded matter print area, and the total length data adjustment is a technique that fixes the predetermined unit length and adjusts the total length data.

With this arrangement, the entire unit print data is printed in the end section of the produced tape and, as a result, the aesthetics of the tape end positioned on the outer circumference is improved even in a case where the printed tape is wound into a roll shape.

BRIEF DESCRIPTION OF THE DRAWINGS

FIG. 19A is a diagram showing the phase adjustment in a case where the unit print data is configured by five sets of element print data.

FIG. 19B is a diagram showing the phase adjustment in a case where the unit print data is configured by five sets of element print data.

FIG. 20A is a diagram showing the tape with print in a case where the end position is matched by period adjustment.

FIG. 20B is a diagram showing the tape with print in a case where the end position is matched by period adjustment.

DETAILED DESCRIPTION OF THE PREFERRED EMBODIMENTS

Figure 1:
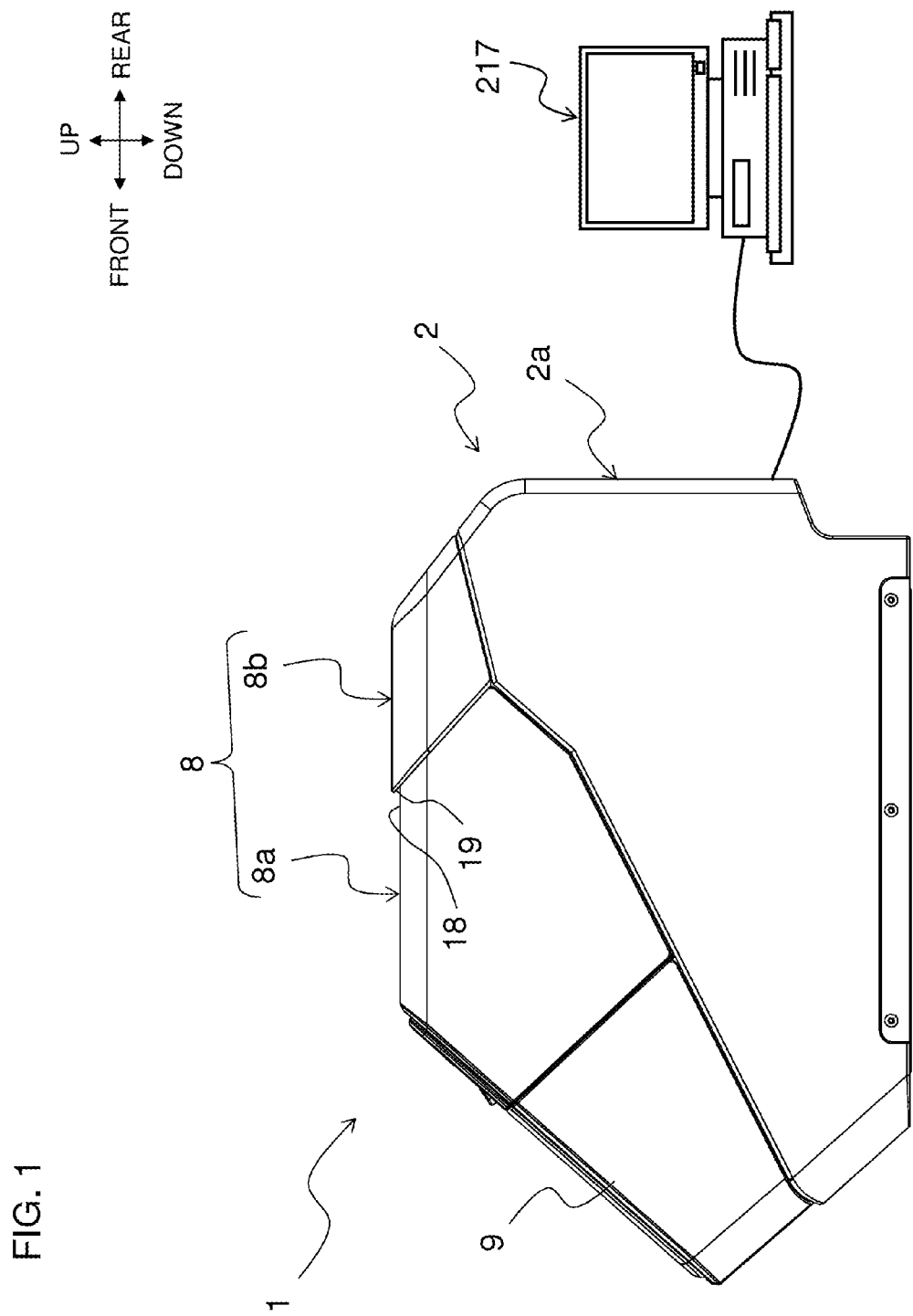
FIG. 1 is a right side view showing an outer appearance of the tape printer with a network configuration in an embodiment of the present disclosure.

The following describes one embodiment of the present disclosure with reference to accompanying drawings. Note that, in a case where "Front," "Rear," "Left," "Right," "Up," and "Down" are denoted in the drawings, the terms "Frontward (Front)," "Rearward (Rear)," "Leftward (Left)," "Rightward (Right)," "Upward (Up)," and "Downward (Down)" in the explanations of the description refer to the denoted directions.

General Configuration of Tape Printer

First, the general configuration of a tape printer 1 serving as the recorded matter producing apparatus in this embodiment will be described with reference to FIGS. 1-4. Note that the following describes a case of a network configuration wherein the tape printer 1 in the example of this embodiment is connected to a personal computer PC 217 (hereinafter, abbreviated "PC 217"), which functions as an operation terminal, in a manner that enables information transmission and reception, as shown in FIG. 1 (the role of the PC 217 will be described in detail later).

In FIGS. 1-4, a tape printer 1 comprises a housing 2 that constitutes the apparatus outer contour, a rearward-side opening/closing part 8, and a frontward-side opening/closing cover 9.

The housing 2 comprises a housing main body 2a, a first storage part 3 disposed on the rearward side of the housing main body 2a, and a second storage part 4 and a third storage part 5 disposed on the frontward side of the housing main body 2a. Note that the first storage part 3, the second storage part 4, and the third storage part 5 will be described later in further detail.

The rearward-side opening/closing part 8 is connected to the upper area of the rearward side of the housing main body 2a in an openable and closeable manner. This rearward-side opening/closing part 8 is capable of opening and closing the area above the first storage part 3 by pivoting. The rearward-side opening/closing part 8 comprises a first opening/closing cover 8a and a second opening/closing cover 8b.

The first opening/closing cover 8a is capable of opening and closing the area above the frontward side of the first storage part 3 by pivoting around a predetermined pivot axis K1 disposed in the upper area of the rearward side of the housing main body 2a. Specifically, the first opening/closing cover 8a is capable of pivoting from a closed position (the states in FIGS. 1-2) in which it covers the area above the frontward side of the first storage part 3, to an open position (the states in FIGS. 3 and 4) in which it exposes the area above the frontward side of the first storage part 3. At this time, the positions of the pivot axis K1 of the first opening/closing cover 8a in the front-rear direction and the up-down direction are further on the rearward side and further on the upward side, respectively, than a roll center RO of a first roll R1 (described later) stored in the first storage part 3.

Figure 2:
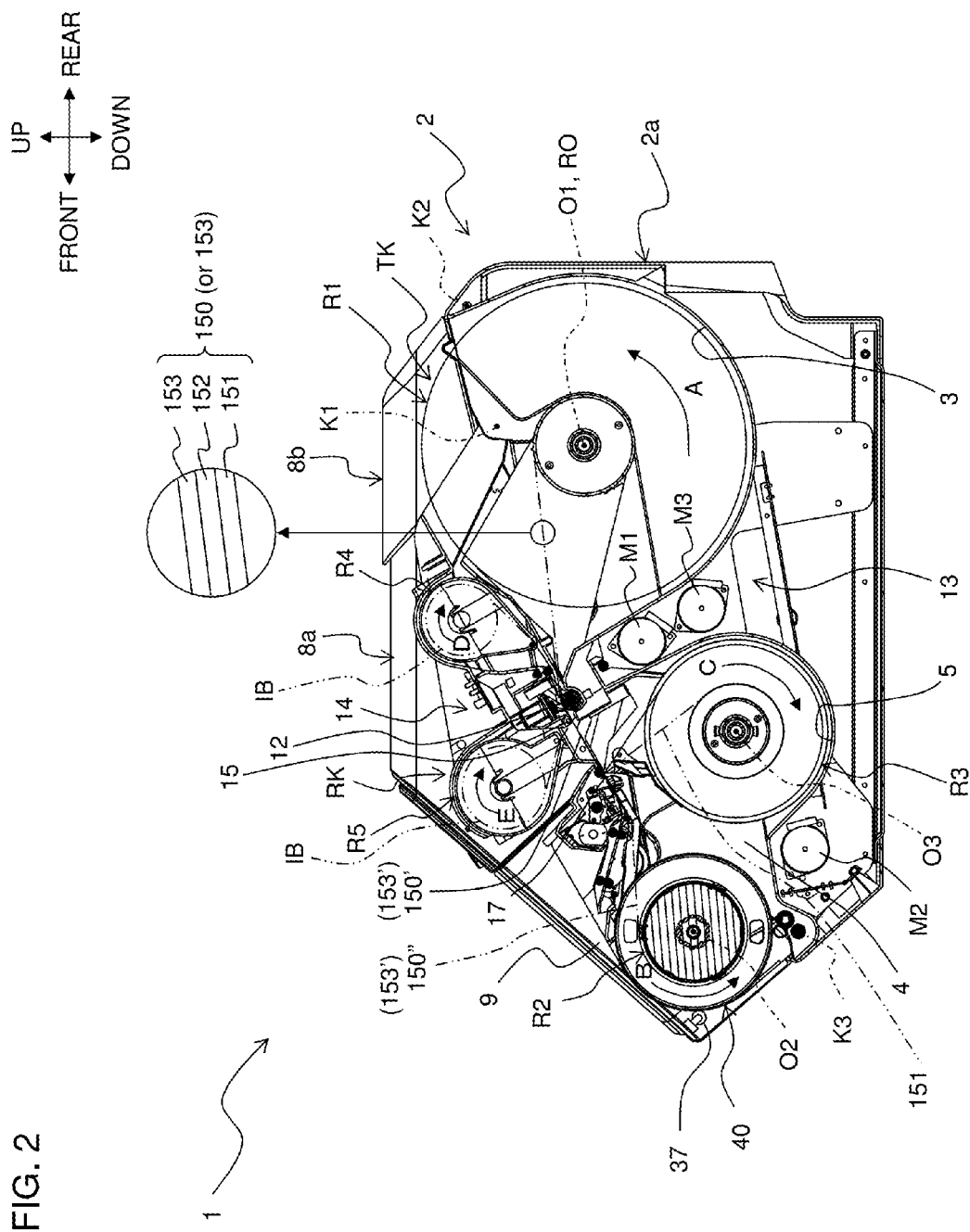
FIG. 2 is a side cross-sectional view showing the internal structure of the tape printer.
Figure 3:
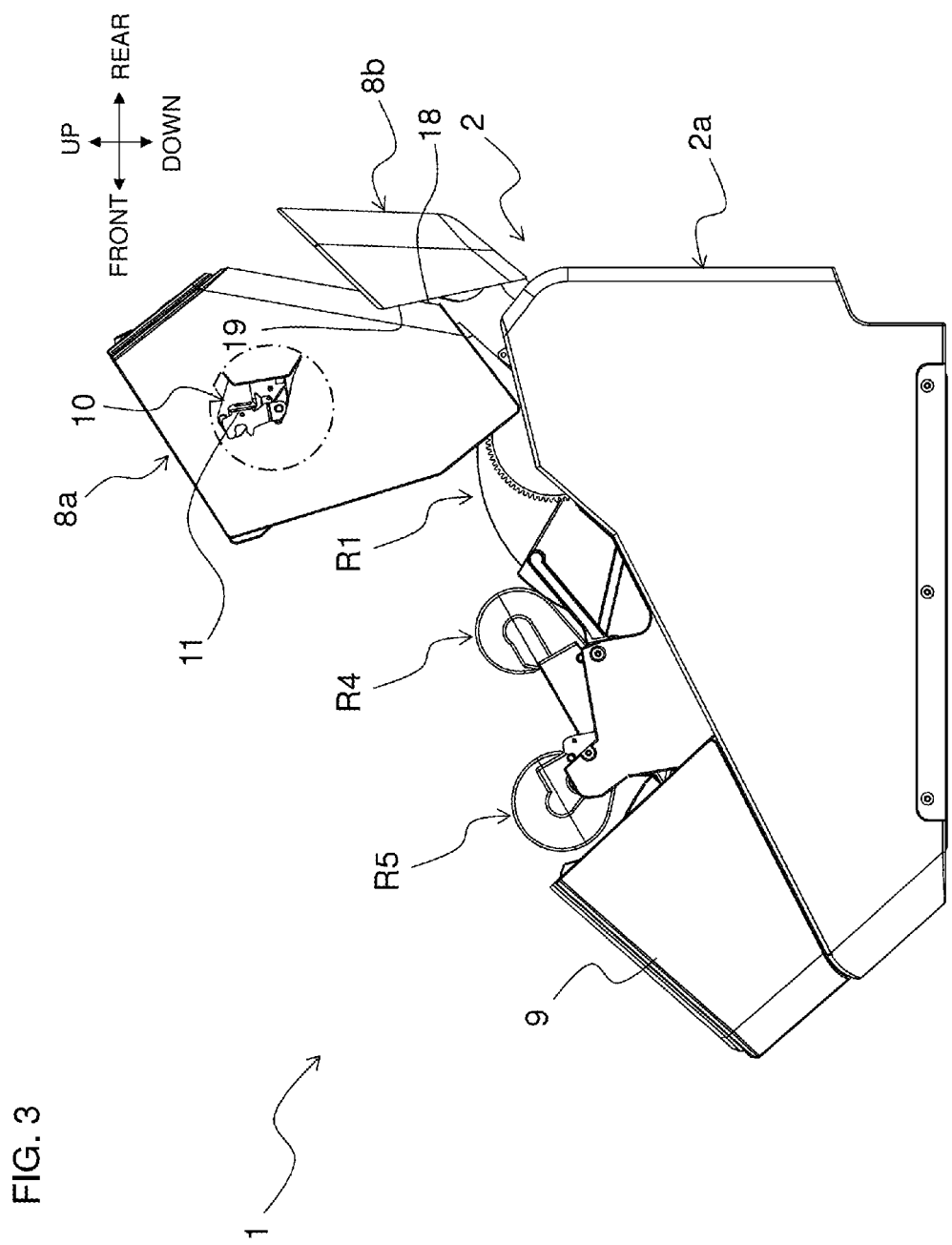
FIG. 3 is a right side view showing the outer appearance of the tape printer with the first and the second opening/closing covers open.

A head holding body 10 is disposed in the interior of the first opening/closing cover 8a (refer to FIG. 3). Then, the first opening/closing cover 8a pivots around the above described pivot axis K1, making it possible to move a print head 11 included in the head holding body 10 relatively closer to or farther away from a feeding roller 12 disposed in the housing main body 2a. Specifically, the first opening/closing cover 8a is capable of pivoting from a closed position (the state in FIG. 2) in which the print head 11 is close to the feeding roller 12, to an open position (the state in FIG. 3) in which the print head 11 is far away from the feeding roller 12.

The second opening/closing cover 8b is disposed further on the rearward side than the above described first opening/closing cover 8a, and is capable of opening and closing the area above the rearward side of the first storage part 3 separately from the opening and closing of the above described first opening/closing cover 8a by pivoting around a predetermined pivot axis K2 disposed on the upper end of the rearward side of the housing main body 2a. Specifically, the second opening/closing cover 8b is capable of pivoting from a closed position (the states in FIGS. 1 and 2) in which it covers the area above the rearward side of the first storage part 3, to an open position (the states in FIGS. 3 and 4) in which it exposes the area above the rearward side of the first storage part 3. At this time, the positions of the pivot axis K2 of the second opening/closing cover 8b in the front-rear direction and the up-down direction are further on the rearward side and further on the upward side, respectively, than the pivot axis K1 of the above described first opening/closing cover 8a. Note that the position of the pivot axis K2 of the second opening/closing cover 8b in the up-down direction may be the same as that of the pivot axis K1 of the above described first opening/closing cover 8a.

Then, the first opening/closing cover 8a and the second opening/closing cover 8b are configured so that, when each is closed, an outer peripheral part 18 of the first opening/closing cover 8a and an edge part 19 of the second opening/closing cover 8b substantially contact each other and cover almost the entire area above the first storage part 3.

The frontward-side opening/closing cover 9 is connected to the upper area of the frontward side of the housing main body 2a in an openable and closeable manner. The frontward-side opening/closing cover 9 is capable of opening and closing the area above the second storage part 4 by pivoting around the predetermined pivot axis K3 disposed on the upper end of the frontward side of the housing main body 2a. Specifically, the frontward-side opening/closing cover 9 is capable of pivoting from a closed position (the states in FIGS. 1-3) in which it covers the area above the second storage part 4, to an open position (the state in FIG. 4) in which it exposes the area above the second storage part 4.

At this time, a tape cartridge TK is detachably mounted in a first predetermined position 13 located below the frontward-side opening/closing cover 9 with the housing main body 2a closed. The tape cartridge TK comprises the first roll R1, a third roll R3, and a connecting arm 16 (refer to FIG. 4) that connects the first roll R1 and the third roll R3.

The first roll R1 is supported on the rearward side of the tape cartridge TK by the connecting arm 16, rotating freely when the tape cartridge TK is mounted to the housing main body 2a. On the first roll R1, a print-receiving tape 150 consumed by feed-out is wound around an axis O1 in the left-right direction in advance. Note that, in each figure of this application, the above described print-receiving tape 150 included in the above described roll R1 is suitably omitted (to avoid complexities in illustration), and only a substantially circular roll flange part disposed so as to sandwich both width-direction sides of the print-receiving tape 150 is shown. In this case, as a matter of convenience, the roll flange part is schematically depicted using the reference numeral "R1."

Then, at this time, the first roll R1 is received from above by the mounting of the tape cartridge TK and stored with the axis O1 of the winding of the print-receiving tape 150 in the left-right direction in the first storage part 3. Then, the first roll R1, stored in the first storage part 3 (with the tape cartridge TK mounted), rotates in a predetermined rotating direction (a direction A in FIG. 2) inside the first storage part 3, thereby feeding out the print-receiving tape 150. According to this embodiment, both an adhesive tape and a non-adhesive tape may be used as the print-receiving tape 150. FIG. 2 illustrates a case where an adhesive print-receiving tape 150 is used. That is, the print-receiving tape 150 is layered in the order of a base layer 153, an adhesive layer 152, and a separation material layer 151, from one side in the thickness direction (upward side in the partially enlarged view in FIG. 2) toward the other side (downward side in the partially enlarged view in FIG. 2). The base layer 153 is a layer on which desired print is formed by the above described print head 11. The adhesive layer 152 is a layer for affixing the base layer 153 to a suitable adherent (not shown). The separation material layer 151 is a layer that covers the adhesive layer 152. The following describes the embodiment based on a case where the above described adhesive print-receiving tape 150 is used, unless otherwise specified.

Further, the above described feeding roller 12 is disposed on a middle upward side of the first storage part 3 and the third storage part 5 of the housing main body 2a. The feeding roller 12 is driven by a feeding motor M1 disposed in the housing main body 2a via a gear mechanism (not shown), thereby feeding the print-receiving tape 150 fed out from the first roll R1 stored in the first storage part 3 in a tape posture in which the tape-width direction is in the left-right direction.

Further, the above described head holding part 10 disposed on the first opening/closing cover 8a comprises the above described print head 11. The print head 11, as described above, is capable of moving relatively closer to or farther away from the feeding roller 12 by the pivoting of the first opening/closing cover 8a around the pivot axis K1. That is, the print head 11 moves closer to the feeding roller 12 when the first opening/closing cover 8a is closed, and farther away from the feeding roller 12 when the first opening/closing cover 8a is opened. This print head 11 is disposed in a position that faces the area above the feeding roller 12 of the head holding part 10, with the first opening/closing cover 8a closed, sandwiching the print-receiving tape 150 fed by the feeding roller 12 in coordination with the feeding roller 12. Accordingly, when the first opening/closing cover 8a is closed, the print head 11 and the feeding roller 12 are disposed facing each other in the up-down direction. Then, the print head 11 forms desired print on the above described base layer 153 of the print-receiving tape 150 sandwiched between the print head 11 and the feeding roller 12 using an ink ribbon IB of a ribbon cartridge RK described later, thereby forming a tape 150' with print.

At this time, the ribbon cartridge RK is detachably mounted in a second predetermined position 14, which is below the first opening/closing cover 8a in a closed state and above the tape cartridge TK in the housing main body 2a. The ribbon cartridge RK comprises a ribbon supply roll R4 and a ribbon take-up roll R5.

The ribbon supply roll R4 is rotatably supported on the rearward side of the ribbon cartridge RK, and rotates in a predetermined rotating direction (a direction D in FIG. 2) with the ribbon cartridge RK mounted, thereby feeding out the ink ribbon IB for forming print by the print head 11.

The ribbon take-up roll R5 is rotatably supported on the frontward side of the ribbon cartridge RK and rotates in a predetermined rotating direction (a direction E in FIG. 2) with the ribbon cartridge RK mounted, thereby taking up the used ink ribbon IB after print formation.

Further, a ribbon take-up roller 15 is included in the downstream side of the print head 11 along the tape transport direction of the first opening/closing cover 8a. The ribbon take-up roller 15 guides the used ink ribbon IB to the ribbon take-up roll R5.

That is, the ink ribbon IB fed out from the ribbon supply roll R4 is disposed further on the print head 11 side of the print-receiving tape 150 sandwiched between the print head 11 and the feeding roller 12, contacting the area below the print head 11. Then, after the ink of the ink ribbon IB is transferred to the base layer 153 of the print-receiving tape 150 by the heat from the print head 11 to execute print formation, the used ink ribbon IB is taken up on the ribbon take-up roll R5 while guided by the ribbon take-up roller 15. Note that, in each figure of this application, the above described ink ribbon IB included in the above described rolls R4, R5 is suitably omitted (to reduce complexities in illustration), and only the roll housing part disposed so as to cover the layered structure of the wound ink ribbon IB is shown. In this case, as a matter of convenience, the roll flange part is schematically depicted using the reference numerals "R4" "R5."

Figure 4:
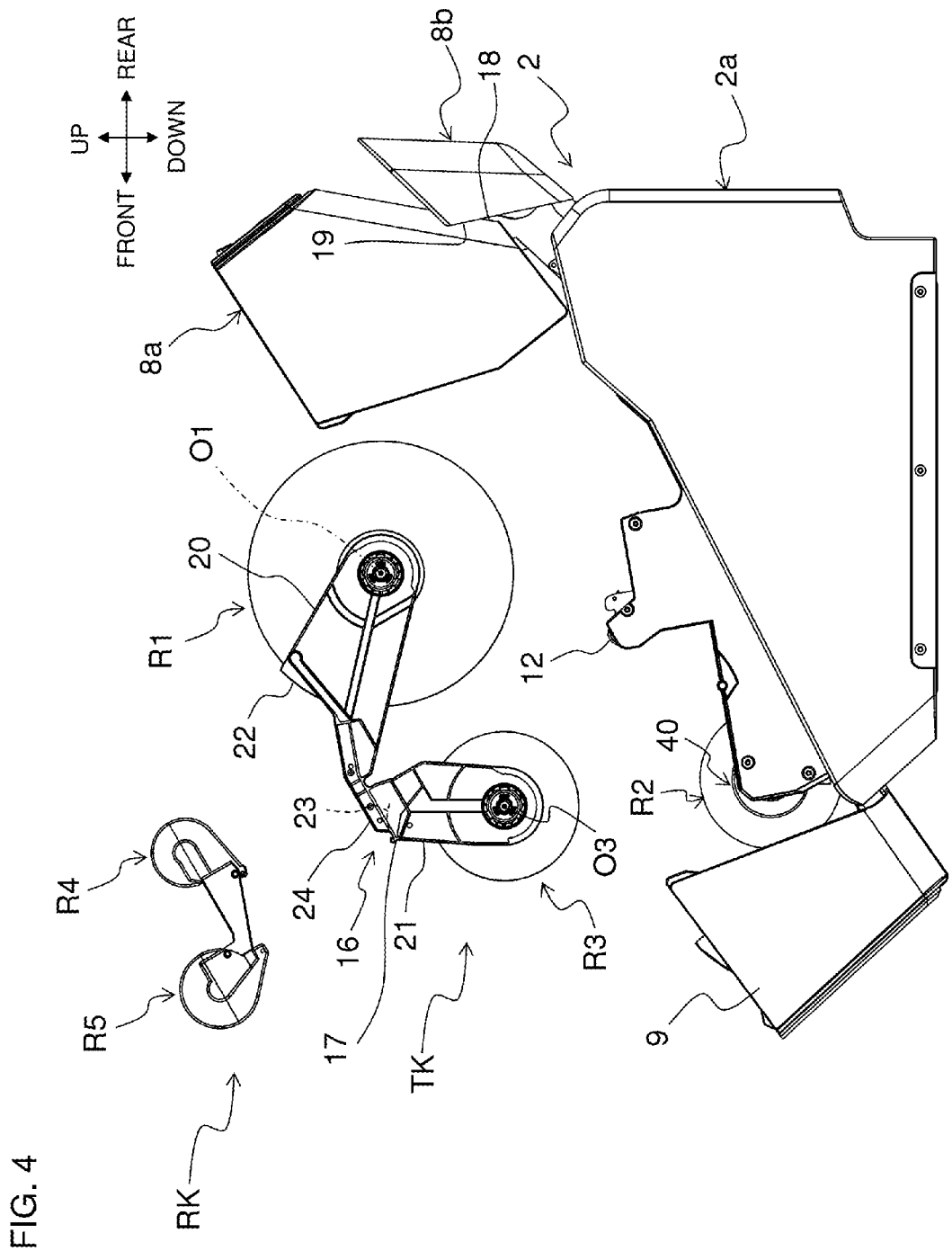
FIG. 4 is an exploded side view showing the tape printer with the first and second opening/closing covers open and the tape cartridge and ribbon cartridge removed.

The connecting arm 16 comprises a peeling part 17 which includes a substantially horizontal slit shape, for example, on the upstream side of the third roll R3 along the tape transport direction (refer to FIG. 4). The peeling part 17 is an area that peels the separation material layer 151 from the tape 150' with print fed out from the first roll R1 and fed to the frontward side. The peeling part 17 peels the separation material layer 151 from the tape 150' with print, separating the separation material layer 151 and a tape 150" with print made of the other layers, i.e., the base layer 153 and the adhesive layer 152. Then, the peeled separation material layer 151 is taken up and wound, forming the above described third roll R3. Further, the tape 150" with print, from which the separation material layer 151 was peeled, is wound on an outer peripheral side of a take-up mechanism 40, forming a second roll R2 described later.

The third roll R3 is supported on the frontward side of the tape cartridge TK (that is, the downstream side of the first roll R1 along the tape transport direction) by the connecting arm 16. The third roll R3 freely rotates with the tape cartridge TK mounted to the housing main body 2a, winding the separation material layer 151 peeled from the tape 150' with print around an axis O3 (axis line) in the left-right direction. Note that, in each figure of this application, the above described separation material layer 151 included in the above described roll R3 is suitably omitted (to avoid complexities in illustration), and only a substantially circular roll flange part disposed so as to sandwich both width-direction sides of the separation material layer 151 is shown. In this case, as a matter of convenience, the roll flange part is schematically depicted using the reference numeral "R3."

At this time, the third roll R3 is received from above by the mounting of the tape cartridge TK and stored with the axis O3 of the winding of the separation material layer 151 in the left-right direction in the third storage part 5. Then, the third roll R3, stored in the third storage part 5 (with the tape cartridge TK mounted), is driven by a separation sheet take-up motor M3 that is disposed in the housing main body 2a via a gear mechanism (not shown) and rotates in a predetermined rotating direction (a direction C in FIG. 2) inside the third storage part 5, thereby taking up the separation material layer 151.

Further, the above described take-up mechanism 40 for sequentially winding the tape 150" with print, formed by the peeling of the separation material layer 151 from the tape 150' with print, is received from above and stored so that it is supported rotatably around an axis O2, with the axis O2 of the winding of the tape 150" with print in the left-right direction in the second storage part 4. Then, the take-up mechanism 40, stored in the second storage part 4, is driven by an adhesive take-up motor M2 that is disposed in the housing main body 2a via a gear mechanism and rotates in a predetermined rotating direction (a direction B in FIG. 2) inside the second storage part 4, taking up and layering the tape 150" with print. With this arrangement, the tape 150" with print is sequentially wound around the outer peripheral side of the take-up mechanism 40, forming the above described second roll R2. Note that, in each figure of this application, the above described tape 150" with print included in the above described roll R2 is suitably omitted (to avoid complexities in illustration), and only a substantially circular roll flange part disposed so as to sandwich both width-direction sides of the tape 150" with print is shown. In this case, as a matter of convenience, the roll flange part is schematically depicted using the reference numeral "R2."

Further, a pressure roller 37 supported in a direction facing the outer peripheral surface of the second roll R2 via a predetermined urging member is disposed on the inner surface of the frontward-side opening/closing cover 9 via a predetermined urging member. In a case where the outer diameter of the second roll R2 is sufficiently large, the tip end of the pressure roller 37 is urged toward and contacts the outer peripheral surface of the second roll R2. Note that the configuration of the above described take-up mechanism 40 and axis O2 periphery will be described later in further detail.

Overview of the Operation of the Tape Printer

Next, an overview of the operation of the tape printer 1 will be described.

That is, when the tape cartridge TK is mounted in the first predetermined position 13, the first roll R1 is stored in the first storage part 3 positioned on the rearward side of the housing main body 2a, and the third roll R3 is stored in the third storage part 5 positioned on the frontward side of the housing main body 2a. Further, the take-up mechanism 40 for forming the second roll R2 is stored in the second storage part 4 positioned on the frontward side of the housing main body 2a.

At this time, when the feeding roller 12 is driven, the print-receiving tape 150 fed out by the rotation of the first roll R1 stored in the first storage part 3 is fed to the frontward side. Then, desired print is formed on the base layer 153 of the fed print-receiving tape 150 by the print head 11, thereby forming the tape 150' with print. When the tape 150' with print on which print was formed is further fed to the frontward side and fed to the peeling part 17, the separation material layer 151 is peeled at the peeling part 17. The peeled separation material layer 151 is fed to the downward side, introduced to the third storage part 5, and wound inside the third storage part 5, forming the third roll R3.

On the other hand, the tape 150" with print from which the separation material layer 151 was peeled is further fed to the frontward side, introduced to the second storage part 4, and wound on the outer peripheral side of the take-up mechanism 40 inside the second storage part 4, thereby forming the second roll R2. At that time, a cutter mechanism 30 (refer to FIG. 6 described later) disposed on the frontward-side opening/closing cover 9 further on the rearward side than the second roll R2, that is, on the upstream side of the second roll R2 along the tape transport direction, cuts the tape 150" with print on which print was formed and from which the separation material layer 151 was peeled. With this arrangement, the tape 150" with print wound around the second roll R2 can be cut based on a timing desired by the user and the second roll R2 can be removed from the second storage part 4 after cutting.

Detailed Structure of Each Component

Next, the detailed structure of each component of the tape printer 1 will be described in order.

Tape Cartridge

Figure 5:
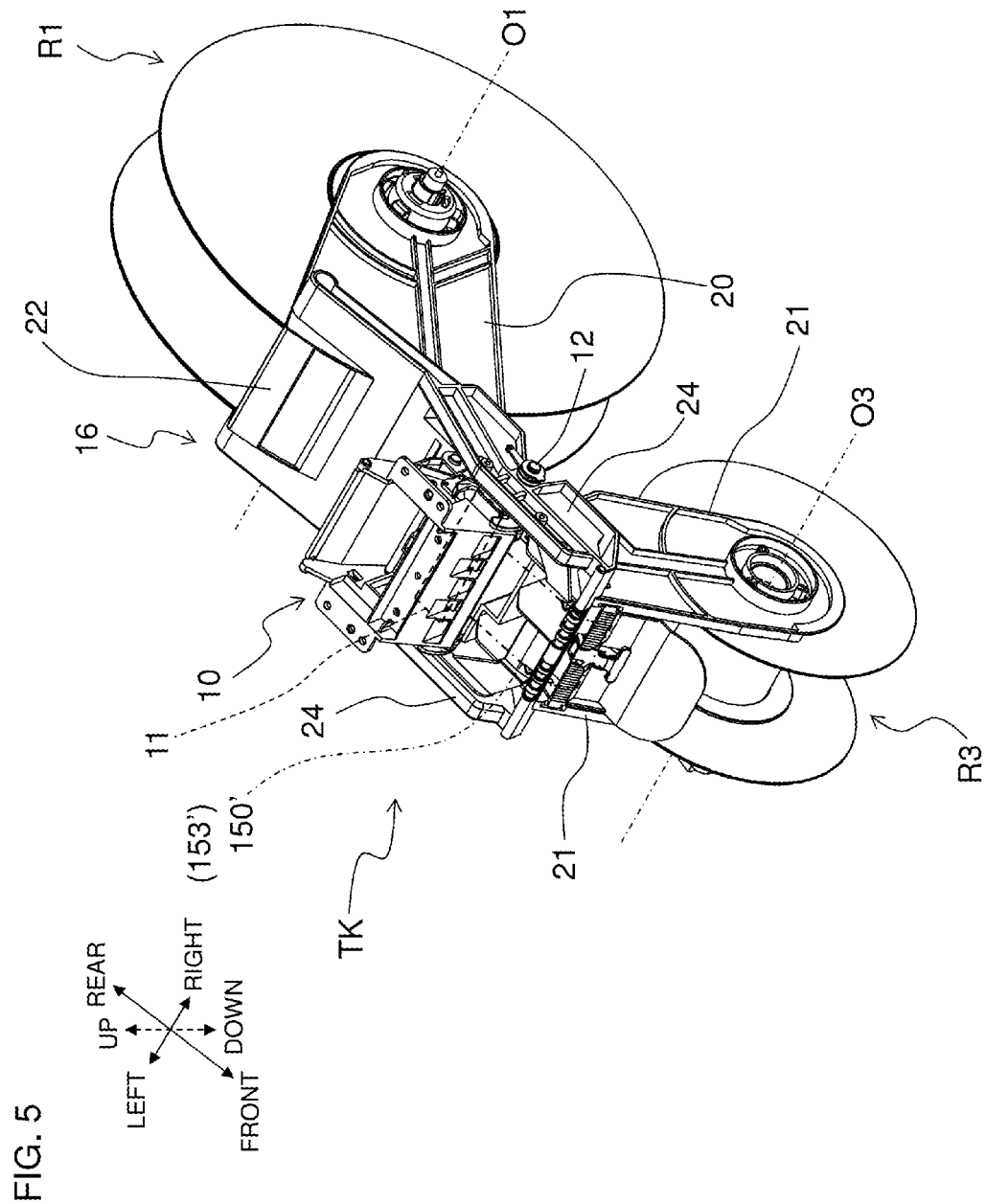
FIG. 5 is a perspective view showing the overall configuration of the tape cartridge.

In FIG. 5 and the above described FIG. 4, the tape cartridge TK comprises the first roll R1, the third roll R3, and the connecting arm 16, as previously described. The connecting arm 16 comprises a left and right pair of first bracket parts 20, 20 disposed on the rearward side, and a left and right pair of second bracket parts 21, 21 disposed on the frontward side. Note that, in FIG. 5, as already noted, the print-receiving tape 150 wound around the axis O1 on the first roll R1, and the separation material layer 151 wound around the axis O3 on the third roll R3 are not shown, and the members comprising the first roll R1 and the third roll R3 are partially shown.

The first bracket parts 20, 20 are set so that the first roll R1 is sandwiched from both the left and right sides along the axis O1, holding the first roll R1 rotatably around the axis O1 with the tape cartridge TK mounted to the housing main body 2a. These first bracket parts 20, 20 are connected by a first connecting part 22 that is extended substantially along the left-right direction on the upper end, avoiding interference with the outer diameter of the first roll R1.

The second bracket parts 21, 21 are set so that the third roll R3 is sandwiched from both the left and right sides along the axis O3, holding the third roll R3 rotatably around the axis O3 with the tape cartridge TK mounted to the housing main body 2a. These second bracket parts 21, 21 are connected by a second connecting part 23 extended substantially along the left-right direction on the upper end.

Then, the first bracket parts 20, 20 and the first connecting part 22 on the rearward side, and the second bracket parts 21, 21 and the second connecting part 23 on the frontward side are coupled by a left and right pair of roll coupling beam parts 24, 24.

Hence, as previously described, when the tape cartridge TK is used, the print-receiving tape 150 is fed out from the first roll R1 and fed, thereby consuming the print-receiving tape 150. On the other hand, the separation material layer 151, which was peeled by the above described peeling part 17 from the tape 150' with print on which print was formed after the feeding of the print-receiving tape 150, is wound around the axis O3 on the third roll R3.

Detailed Structure of Cutter Mechanism

Figure 6:
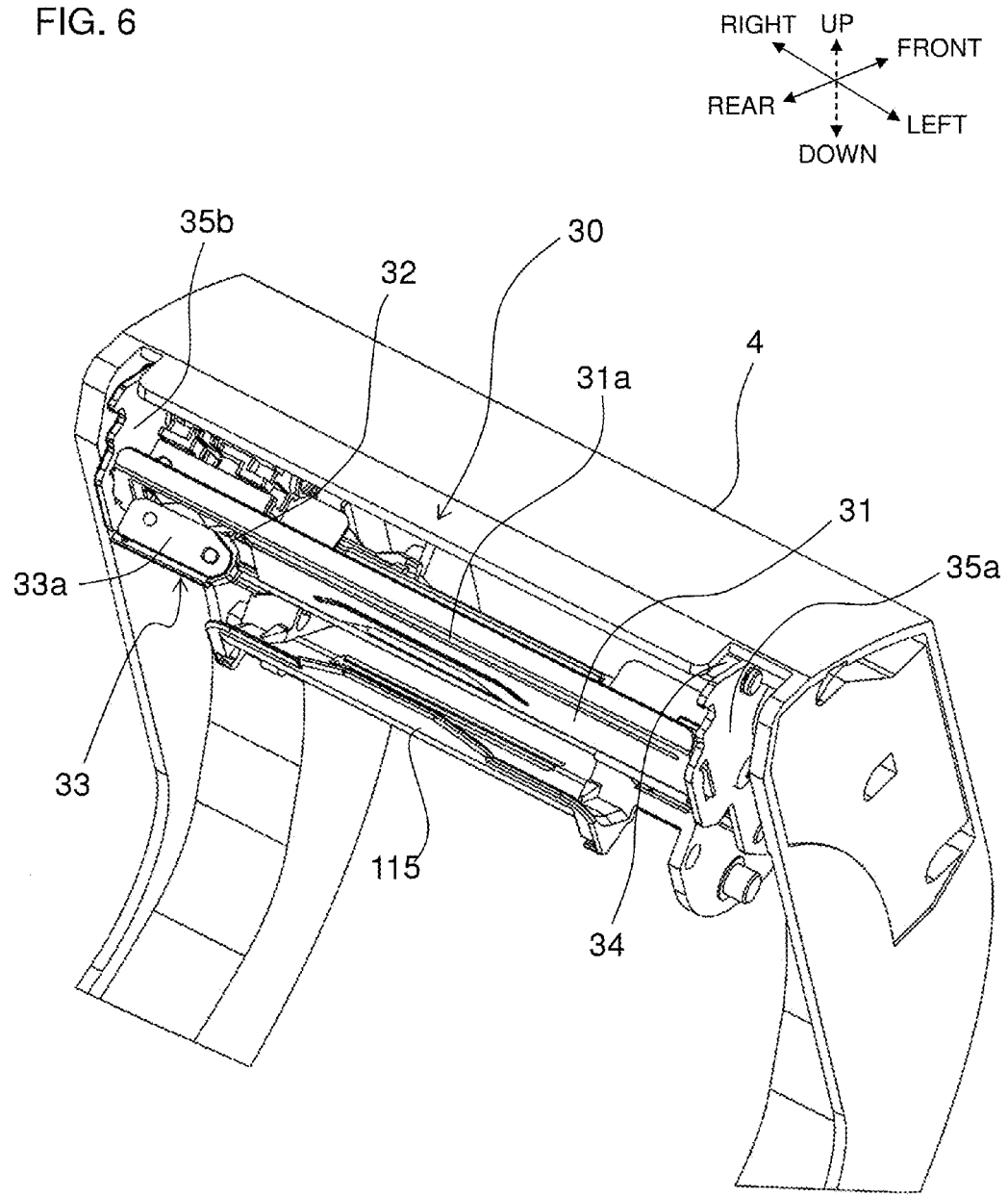
FIG. 6 is a perspective view showing the cutter mechanism provided on the frontward side opening/closing cover.
Figure 7:
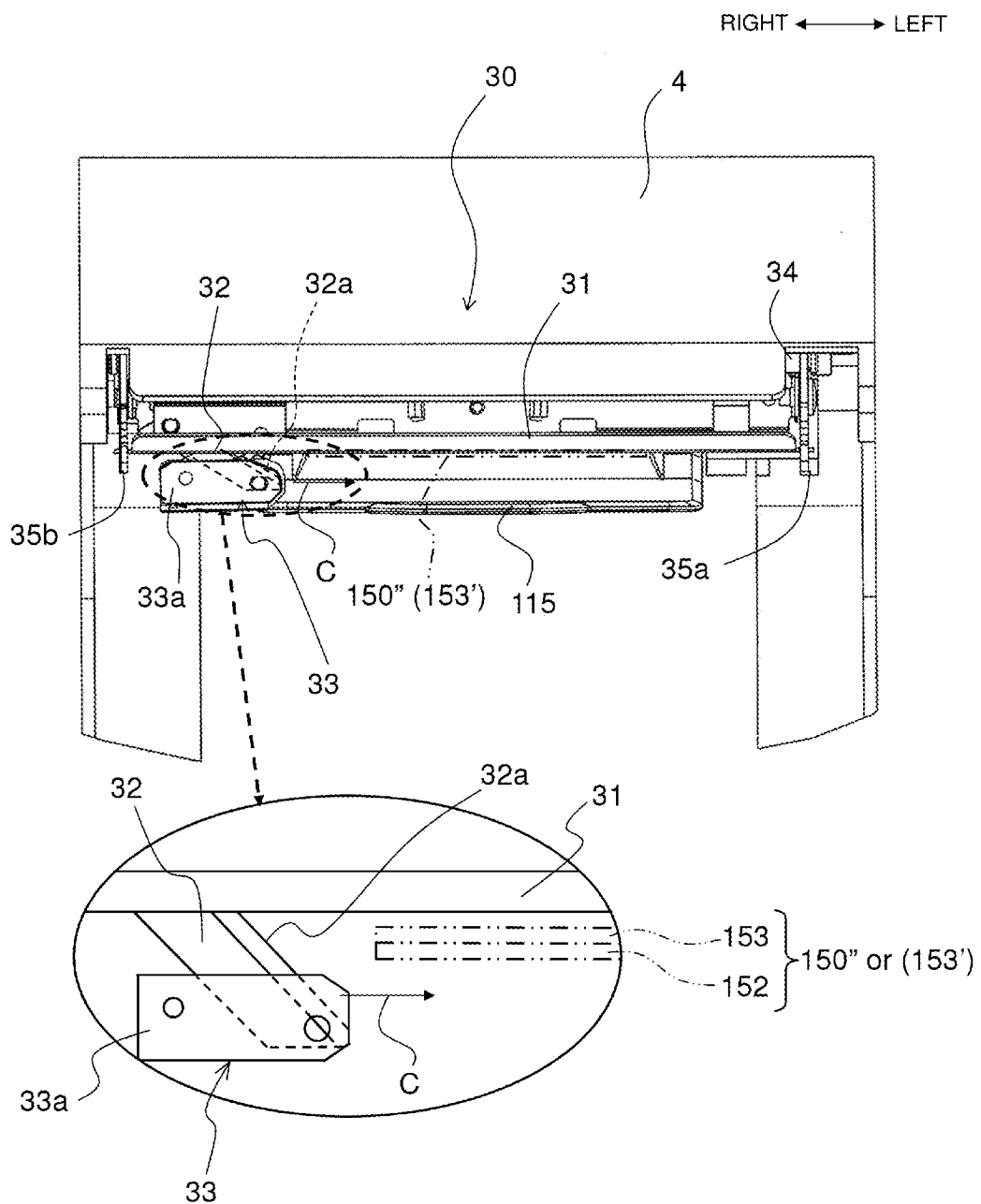
FIG. 7 is a diagram showing the cutter mechanism.

As shown in FIGS. 6 and 7, the cutter mechanism 30 comprises a guide plate 31, a movable blade 32, a carriage 33 comprising a movable blade support part 33a that supports the movable blade 32, and a guide rail 34.

The guide plate 31 is extended along the tape-width direction to the inside of the releasing edge side of the second opening/closing cover 4, further on the downstream side in the tape transport direction than the feeding roller 12. This guide plate 31 is supported by a left and right pair of support plates 35a, 35b with respect to the second opening/closing cover 4. Then, the guide plate 31 contacts the upper surface of the tape 150" with print (in other words, the upper surface of the base layer 153) fed by the feeding roller 12 inside the above described housing 2 in a posture in which the tape-width direction is the left-right direction and guides the tape 150" with print (refer to the imaginary lines in FIG. 7).

The above described movable blade 32 is disposed below the guide plate 31 so that a blade edge 32a faces the guide plate 31 in the up-down direction (so that the blade edge 32a points upward in this example). The movable blade 32 is guided by the guide rail 34, traveling in the tape-width direction along the guide plate 31 by the above described carriage 33 that is made to travel by the driving of the cutter motor (not shown), and performs cutting (refer to arrow C in FIG. 7). The above described guide rail 34 is supported by the above described left and right pair of support plates 35a, 35b with respect to the second opening/closing cover 4.

The movable blade 32 advances from the adhesive layer 152 of the lowermost layer toward the tape 150" with print, while sandwiching the tape 150" with print between itself and the guide plate 31 by the above described travel of the carriage 33 along the guide rail 34, performing the above described cutting. At that time, the above described movable blade support part 33a supports the carriage 33 so that the movable blade 32 slopes toward the above described travel direction along the tape width, in a way that causes the blade edge 32a (refer to FIG. 7) of the movable blade 32 to press the tape 150" with print toward the guide plate 31 direction (slopes downward in this example). With this arrangement, the tape 150" with print is cut in the width direction by the advancing and cutting performed by the blade edge 32a of the downward disposed, obliquely upward pointing movable blade 32 from the adhesive layer 152 of the lowermost layer, while the upper surface (specifically, the upper surface of the base layer 153 after print formation by the print head 11) is contacted and guided by the guide plate 31. A slit 31a is disposed in the tape-width direction on the guide plate 31 at this time, for guiding the travel of the movable blade 32 by the carriage 33.

Note that a shoot 115 for switching the feeding path of the tape 150" with print between a side toward the second roll R2 and a side toward the discharging exit (not shown) is disposed further on the downstream side than the guide plate 31 along the tape transport direction.

Overview of Peripheral Structure of Take-Up Mechanism and Axis O2

Figure 8:
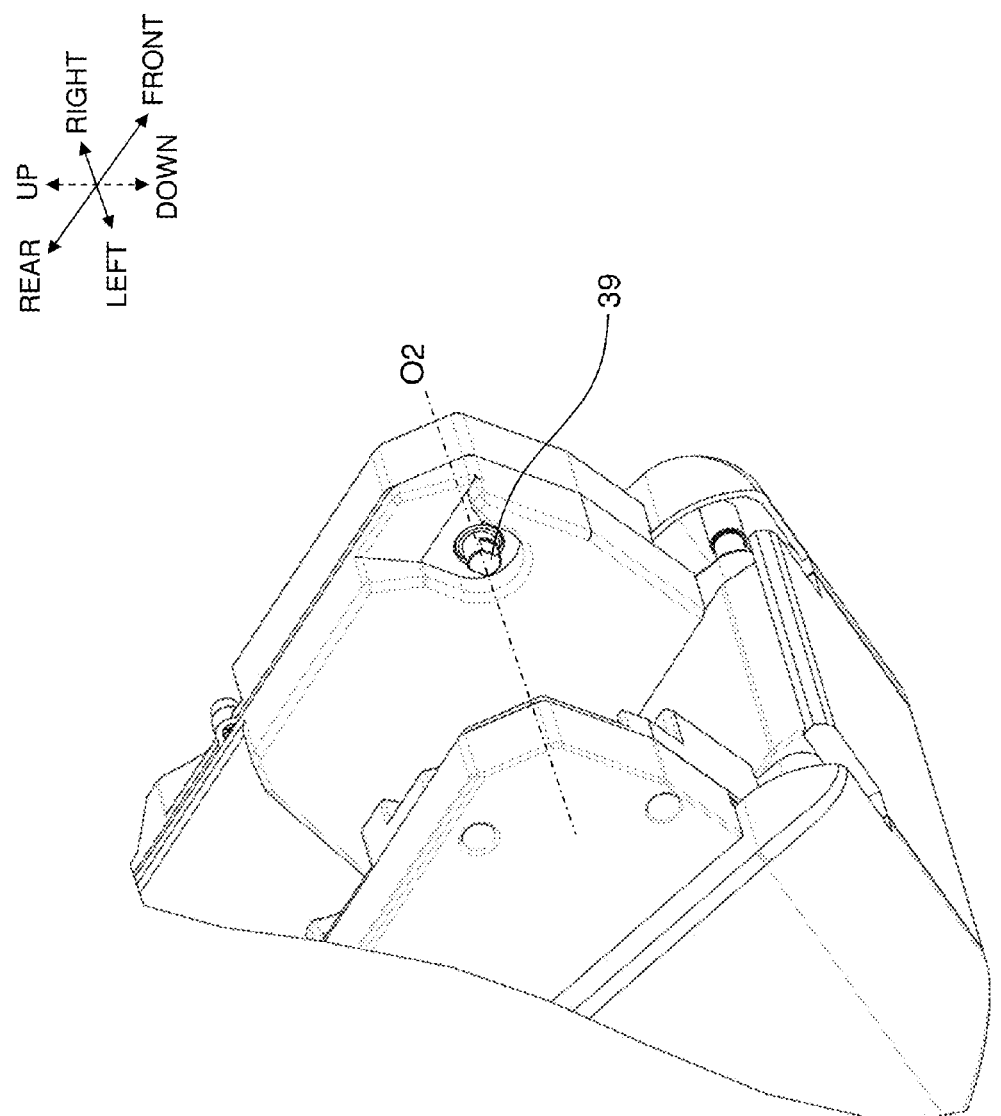
FIG. 8 is a perspective view showing the structure of the bearing part periphery.
Figure 9:
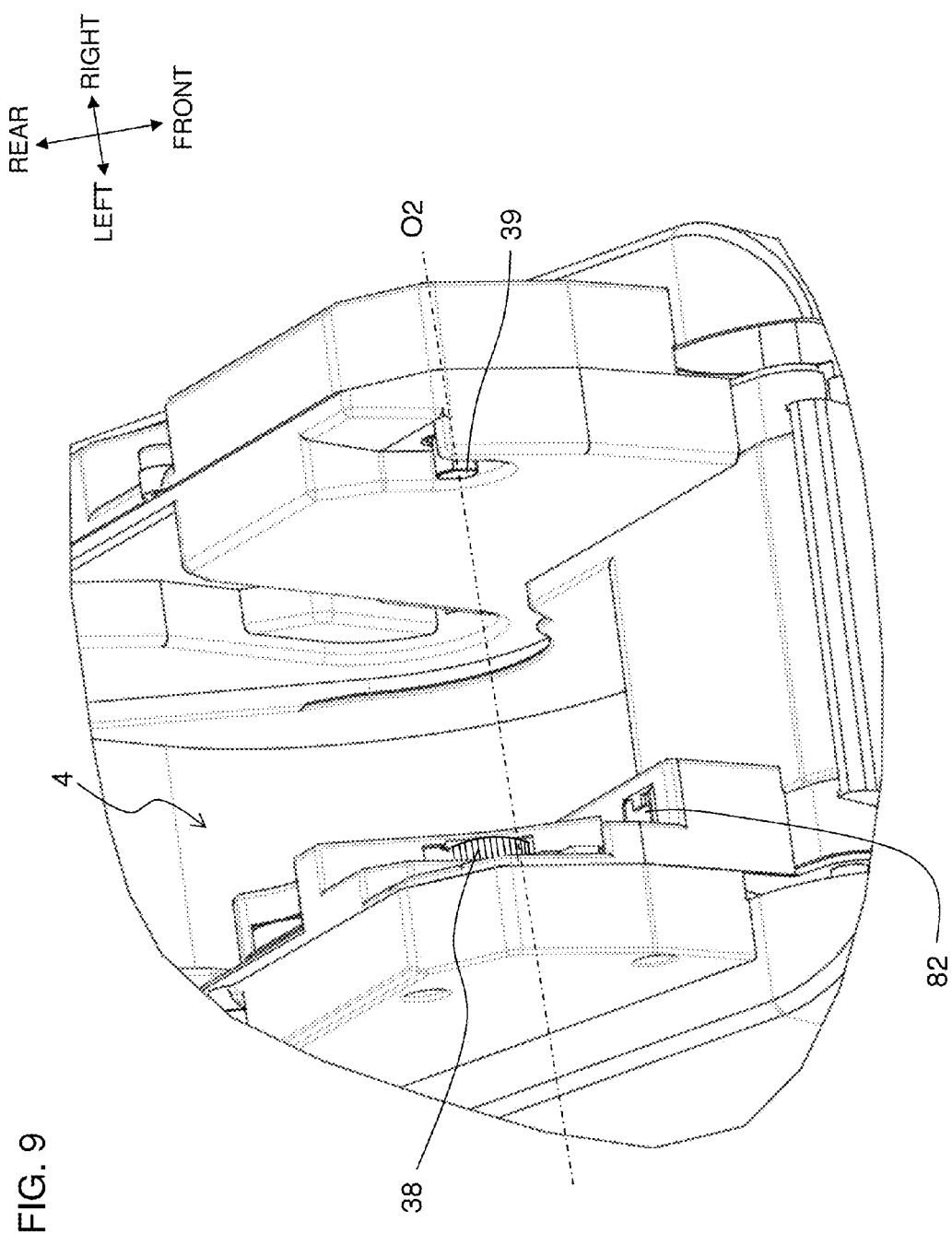
FIG. 9 is a perspective view showing the structure of the bearing part periphery.
Figure 10:
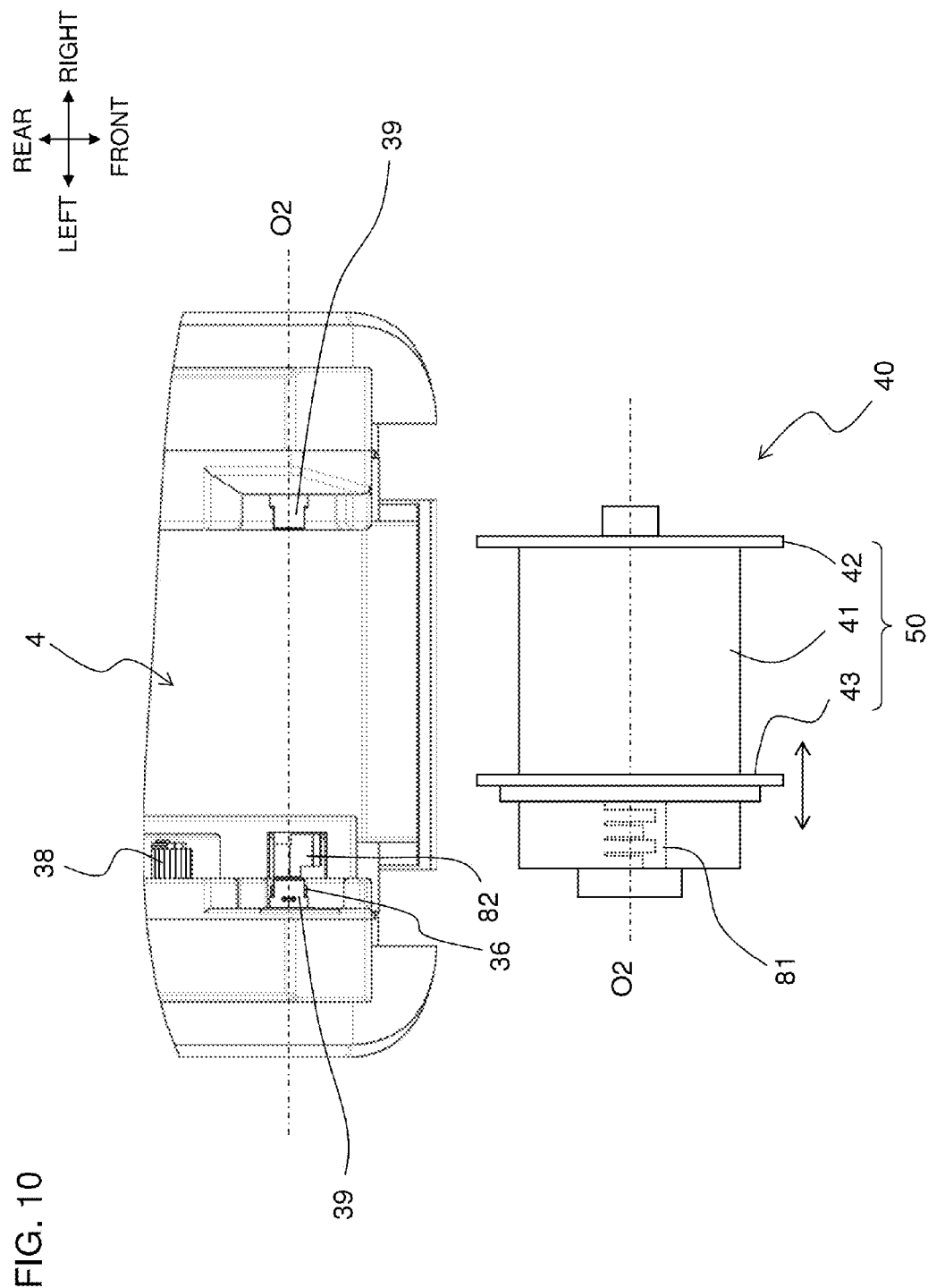
FIG. 10 is a plan view of the bearing part periphery and take-up mechanism as viewed from above.

Further, according to this embodiment, the take-up mechanism 40 is mounted to the second storage part 4 as described above, and the tape 150" with print is taken up and layered on the outer periphery side of this take-up mechanism 40, thereby forming the second roll R2. In FIGS. 8-10, two bearing parts 39 that are substantially pillar-shaped protrusions are fixed inside the second storage part 4 of the housing main body 2a facing both left and right sides along the axis O2 direction when the second roll R2 is mounted so as to sandwich the second roll R2. The respective axial ends of both axial direction sides of the take-up mechanism 40 are respectively mounted to the bearing parts 39, 39, thereby rotatably supporting the center section of the take-up mechanism 40. At this time, a drive gear 38 linked to the above described adhesive take-up motor M2 exposes a portion of the teeth surface thereof toward the bearing part 39, further downward on the rearward side than the left-side bearing part 39 of the second storage part 4 of the housing main body 2a. Note that, in FIGS. 8 and 9, the second roll R2 is not shown.

In FIG. 10, the take-up mechanism 40 is configured so that, as described later in detail, the respective axial ends of both axial direction sides are coupled to form a small diameter support shaft, passing through and rotatably supporting an axial center of a center drum part 50 around which is wound the tape 150" with print. A first outer cylinder 42 comprising a substantially circular flange is mounted to the outer periphery of the right side of the drum part 50, and a second outer cylinder 43 comprising a substantially circular flange is mounted to the outer periphery of the left side of the drum part 50. This second outer cylinder 43 is mounted movably in the axial direction (left-right direction) in a predetermined range of the left-end side of the take-up mechanism 40. With this arrangement, the first outer cylinder 42 and the second outer cylinder 43 are capable of appropriately sandwiching the tape 150" with print wound by the take-up mechanism 40 in the width direction in accordance with the tape width thereof.

A detected part 81 wherein an exposed width changes in accordance with the moved position of the above described second outer cylinder 43 is disposed in a predetermined circumferential position on the left-end side of the take-up mechanism 40. This detected part 81 is formed in a shape in which the exposed amount of the concavoconvex undulations changes in accordance with the exposed width (refer to the dashed line area in the figure). When the take-up mechanism 40 is mounted to the second storage part 4 of the housing main body 2a, it is mounted so that this detected part 81 is positioned downward. A detecting part 82 is disposed in a position facing the detected part 81 in the second storage part 4 of the housing main body 2a when the take-up mechanism 40 is mounted. While not shown particularly in detail, this detecting part 82 mechanically or optically detects the exposed amount of the concavoconvex undulations of the facing detected part 81 to identify the axial-direction position of the above described second outer cylinder 43. With this arrangement, it is possible to automatically detect the tape width of the tape 150" with print sandwiched between the first outer cylinder 42 and the second outer cylinder 43 on the tape printer 1 side, and thus further identify the type and base diameter of the second roll R2 based on this tape width.

Further, a substantially square cylinder shaped protrusion 36 is disposed in a downward neighboring position of the left-side bearing part 39 (back surface position of the bearing part 39 in FIG. 10).

Details of Take-Up Mechanism

Figure 11:
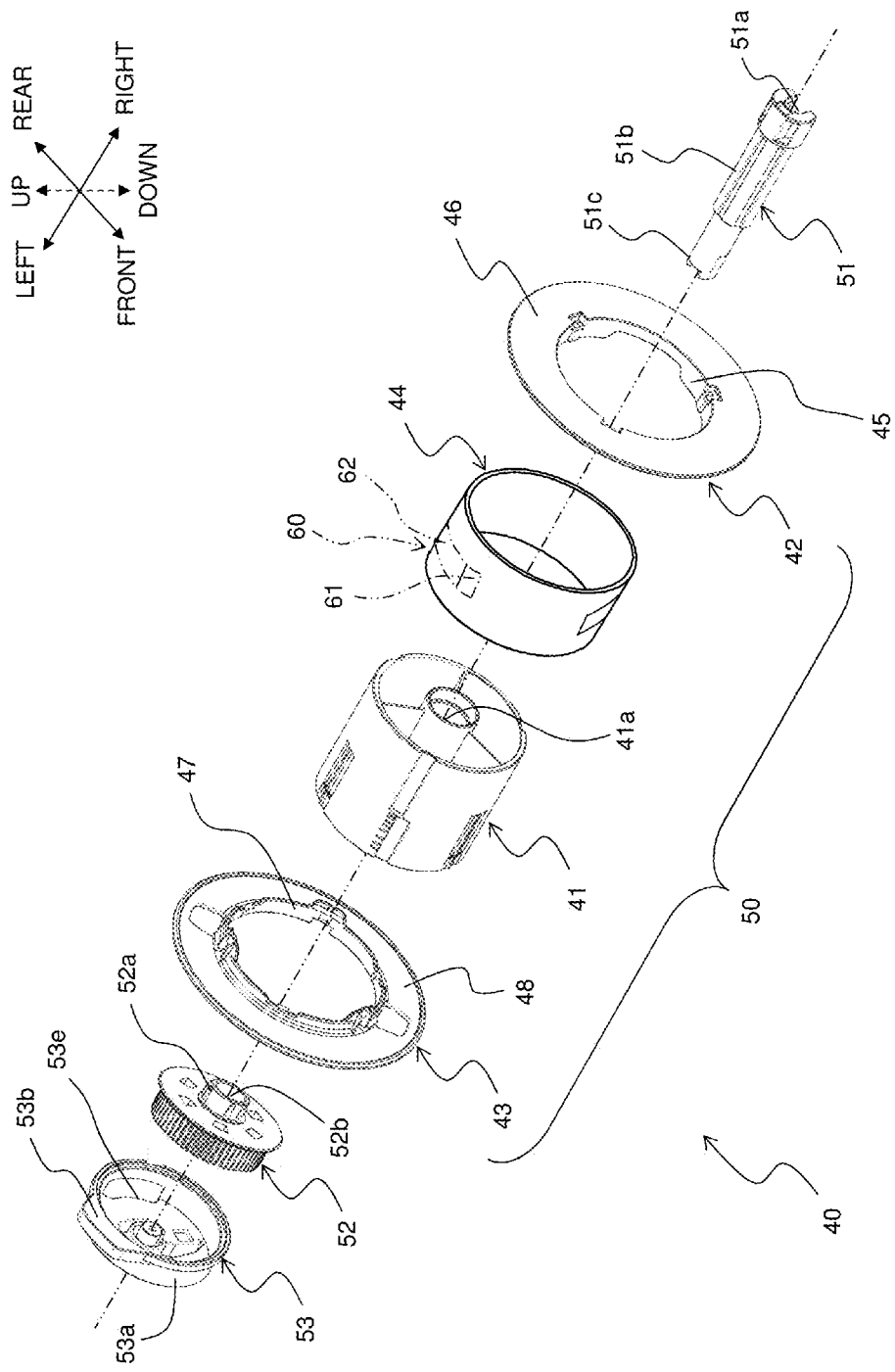
FIG. 11 is an exploded perspective view of the take-up mechanism.
Figure 12A:
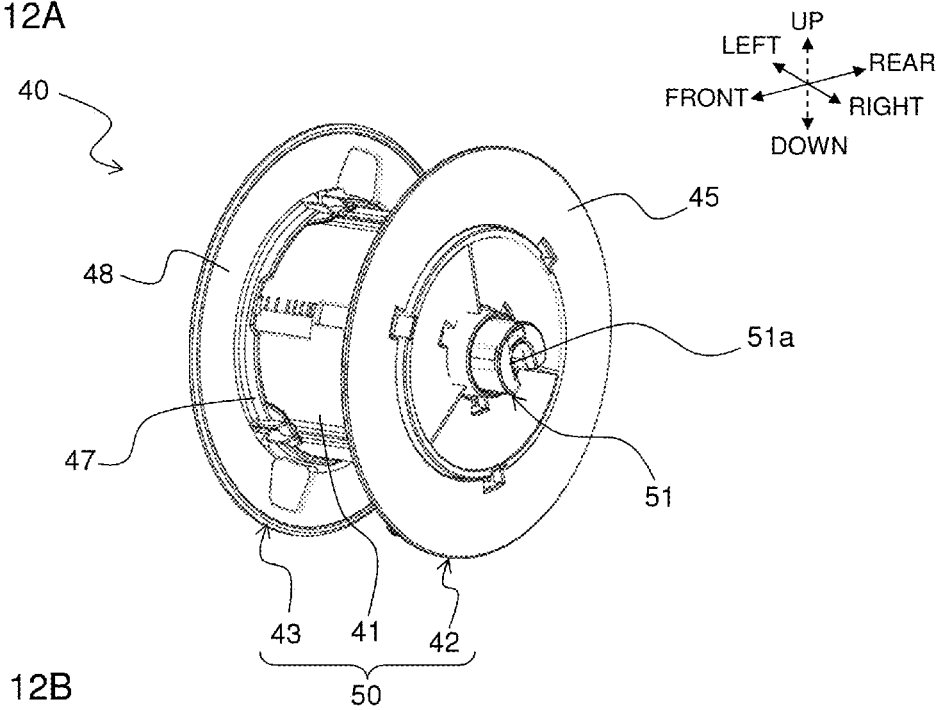
FIG. 12A is a perspective view showing the outer appearance of the fabricated take-up mechanism.
Figure 12B:
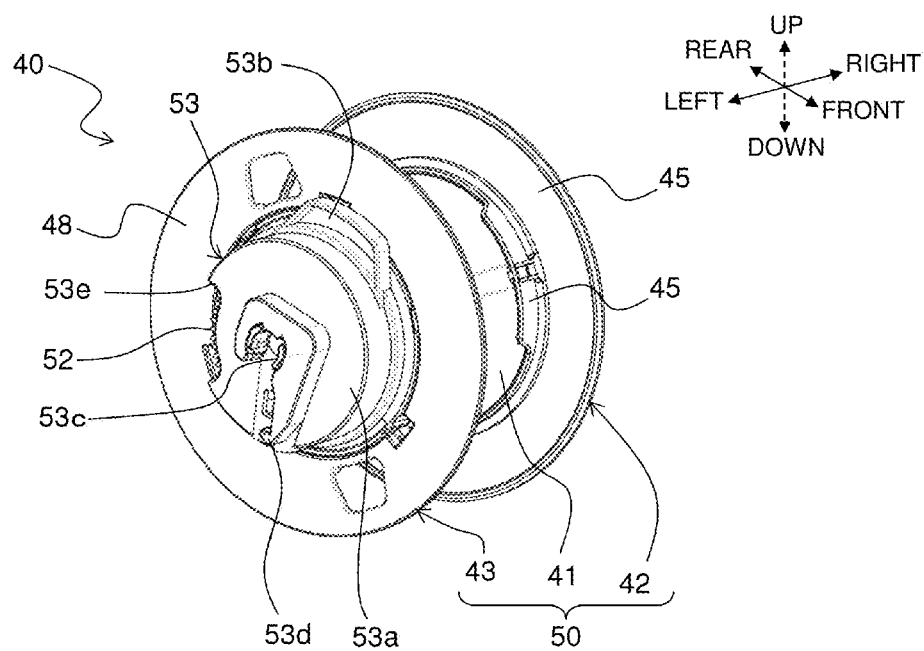
FIG. 12B is a perspective view showing the outer appearance of the fabricated take-up mechanism.

In FIG. 11 and FIG. 12, the take-up mechanism 40 comprises a substantially cylindrical inner cylinder 41 with the above described axis O2 serving as the axis, the above described first outer cylinder 42, the above described second outer cylinder 43, a shaft member 51, a driven gear 52, and a lock member 53.

The first outer cylinder 42 is detachably mounted to the outer peripheral side of one side end (specifically, the right end) along the axial direction (that is, the left-right direction, which is the direction of the axis O2) of the inner cylinder 41. This first outer cylinder 42 comprises a substantially cylindrical first cylinder part 45, and a substantially circular first flange part 46 integrally formed on the right end of the first cylinder part 45.

The second outer cylinder 43 is mounted to the outer peripheral side of the other side end (specifically, the left end) along the axial direction (that is, the left-right direction, which is the direction of the axis O3) of the inner cylinder 41. This second outer cylinder 43 comprises a substantially cylindrical second cylinder part 47, and a substantially circular second flange part 48 integrally formed on the left end of the second cylinder part 47. This second outer cylinder 43, as described above, is mounted movably in the axial direction (left-right direction) in a predetermined range of the left-end side of the take-up mechanism 40. Note that the inner cylinder 41, the first outer cylinder 42, and the second outer cylinder 43 constitute the above described drum part 50.

That is, with the first outer cylinder 42 and the second outer cylinder 43 mounted to the inner cylinder 41, the first flange part 46 and the second flange part 48 are disposed facing each other in the axial direction, forming a space capable of receiving the above described tape 150" with print between the first flange part 46 and the second flange part 48.

Further, with the first outer cylinder 42 and the second outer cylinder 43 mounted to the inner cylinder 41, the first cylinder part 45 and the second cylinder part 47 are extended substantially along the axis O2 so as to connect the first flange part 46 and the second flange part 48, and a substantially cylindrical paper core 44 is mountable to the outer peripheral side of the first cylinder part 45 and the second cylinder part 47 (in other words, in the space between the first flange part 46 and the second flange part 48). The paper core 44 is a supplying member for winding the tape 150" with print formed by the peeling of the separation material layer 151 from the tape 150' with print at the aforementioned peeling part 17 on the outer peripheral side so that the tape-width direction is in the left-right direction. Note that FIG. 12 shows the paper core 44 not mounted to the outer peripheral side of the first cylinder part 45 and the second cylinder part 47 (the same for the above described FIG. 10 as well).

The shaft member 51 is a substantially pillar-shaped member overall, comprising a first engaging part 51a mountable to the above described bearing part 39 disposed in the housing main body 2a on the right-side end, as well as a shank part 51b with a diameter smaller than the first engaging part 51a in the axial-direction center area, and a shaft coupling part 51c on the left-side end. A through-hole 41a is disposed in the axial center of the inner cylinder 41, and the shank part 51b of the shaft member 51 is passed through this through-hole 41a, thereby causing the inner cylinder 41 to be rotatably supported by the shaft member 51.

The driven gear 52 is a gear capable of meshing with the drive gear 38 disposed in the second storage part 4 of the housing main body 2a, and an inserted cylinder 52a constituting a key on the outer peripheral surface is disposed in the center of the right-side end surface thereof. This inserted cylinder 52a is inserted through a left-end opening of the through-hole 41a of the inner cylinder 41, making it possible for the driven gear 52 and the inner cylinder 41 (as well as the first outer cylinder 42 and the second outer cylinder 43) to integrally rotate. Note that a through-hole 52b is also formed in the axial center of the entire driven gear 52, including the inserted cylinder 52a, and the left end of the above described shaft member 51 can be passed through the coupled inner cylinder 51 and driven gear 52.

The lock member 53 comprises a substantially cup-shaped cover part 53a capable of containing the entire above described driven gear 52 in its interior, an operation part 53b disposed in a predetermined circumferential position on the outer periphery of this cover part 53a, a second engaging part 53c disposed in an axial center position on the left-side end surface of the cover part 53a, and a hook part 53d disposed near this second engaging part 53c. Further, the axial center position of the inner side surface of this lock member 53 (the right-side end surface of the cover part 53a) can be detachably coupled to the shaft coupling part 51c of the left end of the above described shaft member 51. Further the second engaging part 53c of the lock member 53 can be mounted to the above described bearing part 39 disposed in the housing main body 2a in the same manner as the above described first engaging part 51a of the shaft member 51. Further, an exposure hole 53e that exposes a portion of the teeth surface of the above described driven gear 52 is disposed in the predetermined circumferential position of the cover part 53a. Note that a tape piece 60 will be described later.

Fabrication Procedure of Take-Up Mechanism

An example of the fabrication procedure of the take-up mechanism 40 in the above described configuration will now be described. That is, when the take-up mechanism 40 is fabricated, first the second cylinder part 47 of the second outer cylinder 43 is inserted in the outer peripheral side of the left end of the inner cylinder 41. At this point in time, the paper core 44 is not yet mounted to the outer peripheral side of the second cylinder part 47, and the second outer cylinder 43 that includes the second flange part 48 is movable in the left-right direction as described above. Then, the left end of the paper core 44 is caused to lightly fit together with the outer peripheral side of the second cylinder part 47 while contacting a right-end surface 48a of the second flange part 48 of the second outer cylinder 43. At this time, the second outer cylinder 43 is moved in the left-right direction in accordance with the width-direction dimension of the paper core 44, thereby making it possible to position the axial direction position of the paper core 44. When the paper core 44 is fully mounted to the outer peripheral side of the second cylinder part 47, the second outer cylinder 43 that includes the second flange part 48 becomes fixed to the outer peripheral side of the inner cylinder 41 and is no longer movable in the left-right direction. Then, the first outer cylinder 42 that includes the first flange part 46 is detachably mounted to the outer periphery of the right end of the inner cylinder 41 where the paper core 44 exists on the outer peripheral side. At this time, the right end of the paper core 44 is positioned by the first flange part 46 so as to contact a left-end surface 46a of the first flange part 46 of the first outer cylinder 42.

Furthermore, the driven gear 52 is mounted to the left end of the inner cylinder 41 and covered by the lock member 53. Then, the shaft coupling part 51c and the shank part 51b of the shaft member 51 are passed through the through-hole at the axial center of the driven gear 52 and the inner cylinder 41 integrally coupled, and the tip end of the shaft coupling part 51c is detachably coupled to the inner surface of the lock member 53. With the above, the take-up mechanism 40 is fabricated (refer to FIG. 12A and FIG. 12B). In this fabricated state, the inner cylinder 41, the first outer cylinder 42, the second outer cylinder 43, the paper core 44, and the driven gear 52 are integrally coupled, and the shaft member 51 and the lock member 53 are integrally coupled. The torque transmitted to the driven gear 52 is transmitted to the inner cylinder 41, the first outer cylinder 42, the second outer cylinder 43, and the paper core 44, causing them to rotate with respect to the shaft member 51 and the lock member 53.

Then, with the first engaging part 51a of the shaft member 51 and the second engaging part 53c of the lock member 53 mounted so as to be respectively supported by the above described two bearing parts 39, 39, the entire take-up mechanism 40 is stored in the aforementioned second storage part 4. Then, the driven gear 52 meshes with the drive gear 38, and take-up of the above described tape 150" with print is performed. That is, the entire take-up mechanism 40, mounted to the bearing part 39, rotates around the axis O2 while the tape 150" with print is sequentially wound on the outer peripheral side of the paper core 44. With this arrangement, the tape 150" with print is sequentially wound and layered on the outer peripheral side of the paper core 44, forming the above described second roll R2. Note that, since the paper core 44 is incorporated in the take-up mechanism 40 as a portion of the drum part 50 as previously described, the paper core 44, in other words, is rotatably mounted with respect to the bearing part 39 via the inner cylinder 41, the shaft member 51, and the like.

Note that the take-up mechanism 40 can be repeatedly disassembled and assembled with all members intact, including the paper core 44 as well. With this arrangement, after the tape 150" with print is sequentially introduced into the space between the above described first flange part 46 and the second flange part 48 and layered on the paper core 44 mounted to the first cylinder part 45 and the second cylinder part 47 to form the second roll R2 with the rotation of the take-up mechanism 40, the take-up mechanism 40 can be disassembled in its entirety to remove the second roll R2 only.

Control System

Figure 13:
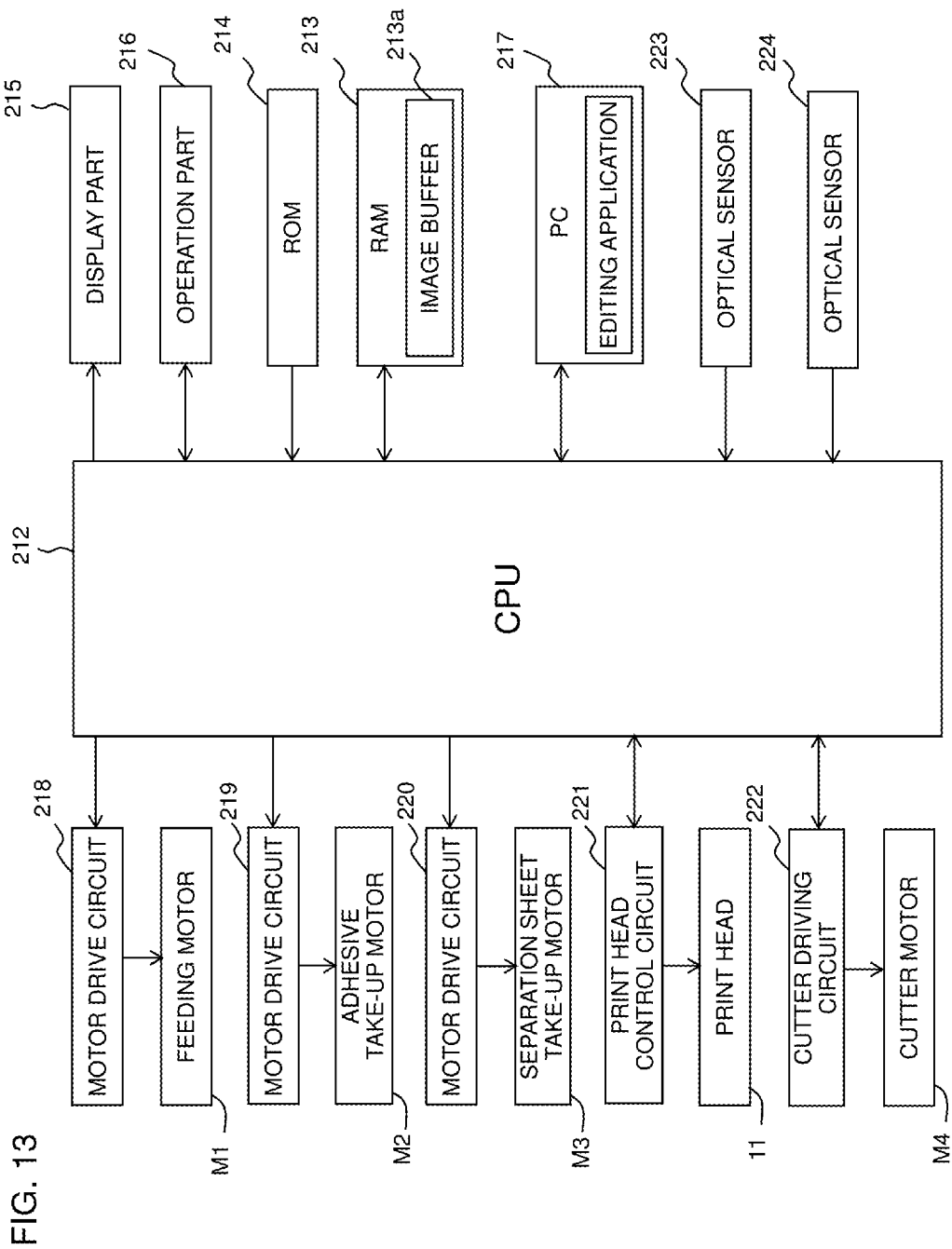
FIG. 13 is a block diagram showing the configuration of the control system of the tape printer in an example of the network configuration.

Next, the control system of the tape printer 1 will be described using FIG. 13. In FIG. 13, the tape printer 1 comprises a CPU 212 that constitutes a computing part that performs predetermined computations. The CPU 212 is connected to a RAM 213 and a ROM 214. The CPU 212 performs signal processing in accordance with a program stored in advance in the ROM 214 while utilizing a temporary storage function of the RAM 213, and controls the entire tape printer 1 accordingly. At this time, a control program for executing tape production processing described later is stored in the ROM 214. This CPU 212 is connected to a motor driving circuit 218 that controls the driving of the above described feeding motor M1 that drives the above described feeding roller 12, a motor driving circuit 219 that controls the driving of the above described adhesive take-up motor M2 that drives the above described second roll R2, a motor driving circuit 220 that controls the driving of the above described separation sheet take-up motor M3 that drives the above described third roll R3, a print head control circuit 221 that controls the conduction of the heating elements of the above described print head 11, and a motor driving circuit 222 that controls the driving of the above described cutter motor M4 that causes the movable blade 32 of the above described cutter mechanism 30 to travel.

Furthermore, a display part 215 and an operation part 216, two optical sensors 223, 224 respectively corresponding to the second roll R2 and the third roll R3, and a PC 217 are connected to the CPU 212. The PC 217 is a general personal computer, and executes a predetermined print data editing application to generate the unit print data and total tape length data described later, and transmits the data to the tape printer 1.

The RAM 213 comprises an image buffer 213a that expands unit print data having an image data format received from the PC 217 into dot pattern data for printing in a print area of the above described print-receiving tape 150, and stores the dot pattern data. The CPU 212 performs repeated printing (described later in detail) by the print head 11 via the print head control circuit 217 in accordance with the print data stored in the image buffer 213a and executes tape production processing that produces an adhesive tape while feeding out the print-receiving tape 150 by the feeding roller 12, according to a control program stored in the ROM 214.

Repeated Printing

Figure 14:
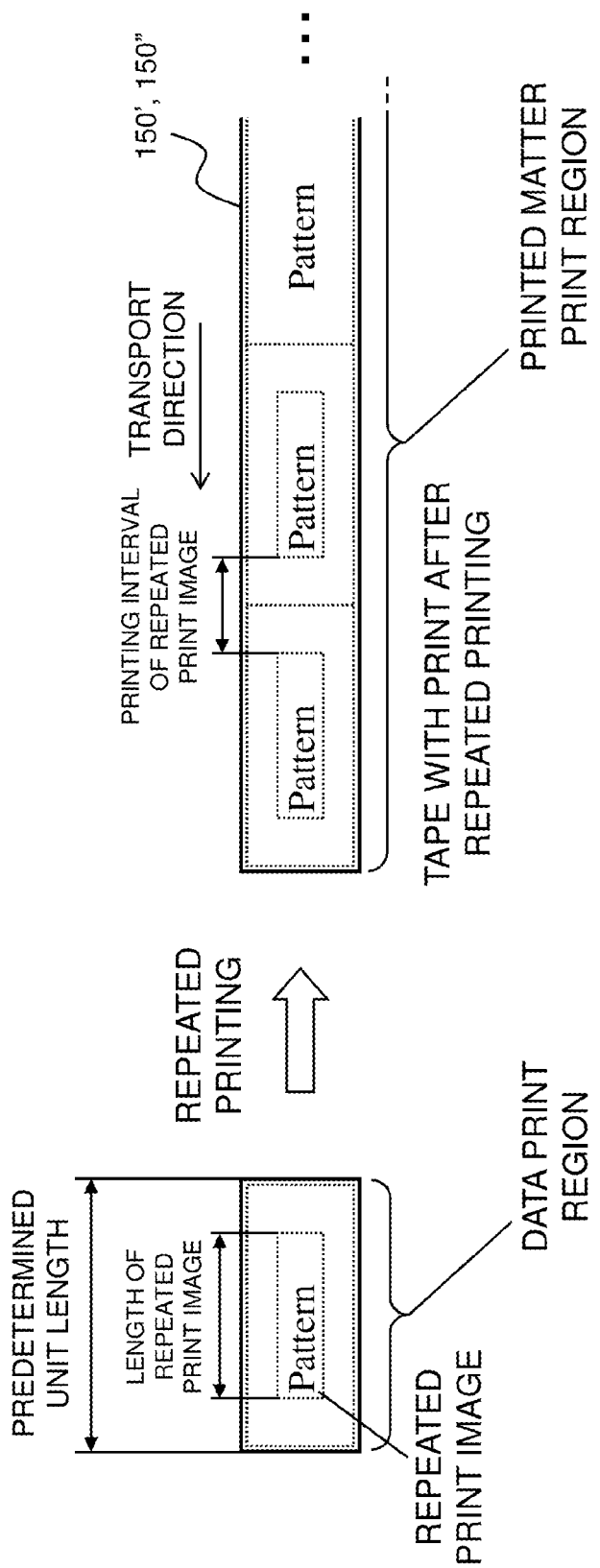
FIG. 14 is a diagram showing the repeated printing of unit print data.

Next, in this embodiment, the repeated printing performed by the above described tape printer 1 will be described. The tape printer 1 is capable of forming print on the print-receiving tape 150 across a length that extends as far as a few dozen meters, and taking up the tape 150' with print after print formation on the second roll R2, as described above. When printing on a long print-receiving tape 150 in this manner, the data amount becomes extensive when the print data across the entire length thereof is simply generated. Hence, according to this embodiment, a plurality of data print areas separated per predetermined unit length along the transport direction of the print-receiving tape 150 is set as shown in FIG. 14, and printing is continuously repeatedly performed (repeated printing is performed) using the identical print data (unit print data) in each of the plurality of data print areas with this rectangular shape. In this manner, in repeated printing, periodic printing using the above described unit print data is performed in the printed matter print area across the total tape length. The print data editing application executed on the PC 217 can edit and generate unit print data to be printed by such repeated printing, and generate total tape length data regarding the tape length to be printed by repeated printing.

In performing this repeated printing, a repeated print image that is printed in the above described data print area needs to be generated and the position where the repeated print image is to be printed in the data print area needs to be set. The user can edit the printing contents including such settings using the print data editing application on the PC 217, and the print data editing application generates the above described unit print data that reflects the editing results. In the example shown, the above described unit print data is generated so that the repeated print image of the text of the character string "Pattern" for which a desired font, point size, and the like has been set is printed in a center position of the data print area. Note that the contents of the repeated print image may be something other than such text shown in the example, such as a geometric graphic, photo, or the like, for example. Further, the spacing of the printing of the repeated print image along the transport direction may also be regulated based on position settings. The print data editing application can thus automatically set an appropriate predetermined unit length of the data print area based on the length and spacing of the repeated print image along the transport direction. Hence, the predetermined unit length is set longer than the transport-direction length of the repeated print image.

Further, the user can arbitrarily set the length (that is, the total length of the tape) at which the repeated print image based on the above described unit print data is to be repeatedly printed using the print data editing application on the PC 217, and the print data editing application generates these setting contents as total tape length data. The PC 217 transmits the two sets of data including the generated above described unit print data and above described total tape length data to the tape printer 1 via the network. Note that "length" and "distance" in this embodiment, including the above as well, are all expressed in units of the number of dots when the image data is expanded to the image buffer 213*a*.

Special characteristics of this embodiment In the above repeated printing, the above described unit print data for forming a repeated print image per predetermined unit length is arbitrarily set by the user as described above, and thus the corresponding above described predetermined unit length is also set to an arbitrary length by the user. Further, on the other hand, the total length of the tape on which printing is performed by the repeated printing is also set to an arbitrary length by the user, as described above.

Figure 15A:
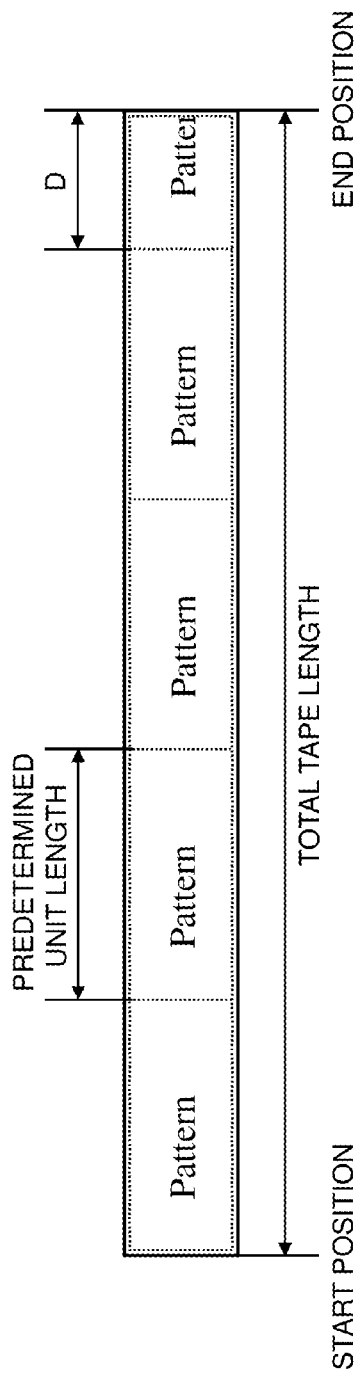
FIG. 15A is a diagram showing the tape with print in a case where the end position is misaligned.
Figure 15B:
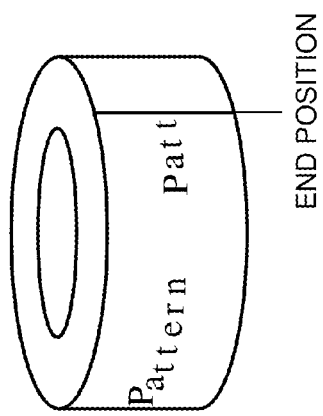
FIG. 15B is a diagram showing the roll of the tape with print in a case where the end position is misaligned.

Nevertheless, when the predetermined unit length and the total tape length are each arbitrarily individually set as described above, the possibility exists that the total tape length will not be an integer multiple of the predetermined unit length. As a result, in a case where the repeated print image that uses the unit print data is repeatedly printed per predetermined unit length from the tape start position, there is a high possibility that formation of one repeated print image will end halfway at the tape end position, as shown in FIG. 15A. In particular, in a case where this tape with print is wound into a roll shape as described above, the above described halfway formed repeated print image stands out at the tape end positioned on the outer circumference as shown in FIG. 15B, marring the aesthetics.

Hence, according to the tape printer 1 in this embodiment, unit print data corresponding to the above described predetermined unit length and total length data indicating the above described total tape length are acquired from the PC 217. Then, an adjustment is made so as to match the end position (along the transport direction) of the above described printed matter print area where the repeated print image based on the above described unit print data is periodically printed on the tape 150" with print, and the end position of the above described data print area where the repeated print image is formed in the last sequence, by either print data mode adjustment or total length data adjustment described later. The above described print data mode adjustment is a technique that fixes the total tape length data and adjusts the print mode (of the repeated print image) based on the unit print data in the printed matter print area, and the total length data adjustment is a technique that fixes the phase and the predetermined unit length and adjusts the total tape length data. The following describes these techniques in order, including respective modifications as well.

Print Data Mode Adjustment 1: Phase Adjustment

Figure 16A:
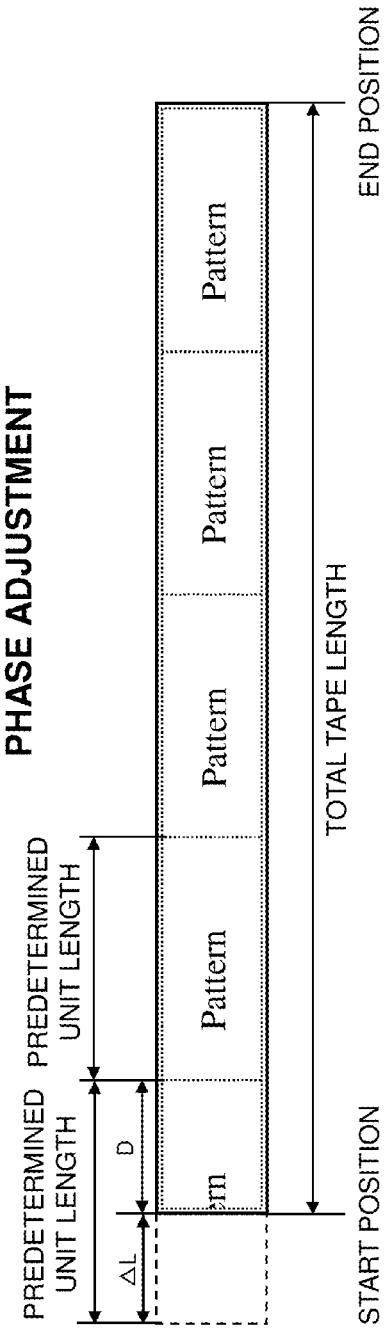
FIG. 16A is a diagram showing the tape with print in a case where the end position has been matched by phase adjustment.
Figure 16B:
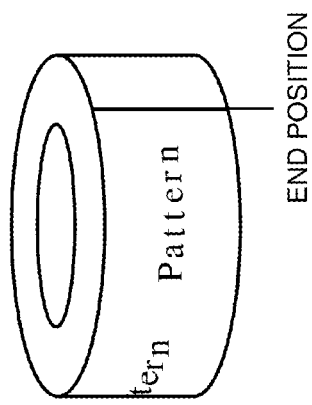
FIG. 16B is a diagram showing the roll of the tape with print in a case where the end position has been matched by phase adjustment.

In the repeated printing, one repeated print image based on one set of unit print data is periodically printed in a plurality of locations in a printed matter print area, as described above. As a result, the relative positional relationship (phase) of the entire repeated print image formed in a plurality with respect to the printed matter print area is adjusted, making it possible to match the end positions. For example, as shown in FIG. 16 corresponding to the above described FIG. 15, the phase during repeated print image formation is shifted (delayed in this example) by an amount equivalent to a surplus length D corresponding to the remainder when the transport direction length of the printed matter print area is divided by the above described predetermined unit length. With this arrangement, it is possible to match the end position of the printed matter print area and the end position of the data print area where the repeated print image is formed in the last sequence. Specifically, the value that results when the above described surplus length D is subtracted from the predetermined unit length is set as a phase delay value $\Delta L$ and, in the data print area where the repeated print image is formed in the first sequence, the repeated print image is formed using the dot pattern of the dot coordinate position and thereafter that is on the downstream side from the dot coordinate position of the transport direction beginning of the unit print data by an amount equivalent to the above described phase delay value $\Delta L$. In the data print areas thereafter, the repeated print image is formed using the dot pattern from the dot coordinate position at the transport direction beginning of the unit print data.

Control Details of Repeated Adjustment Print Processing

Figure 17:
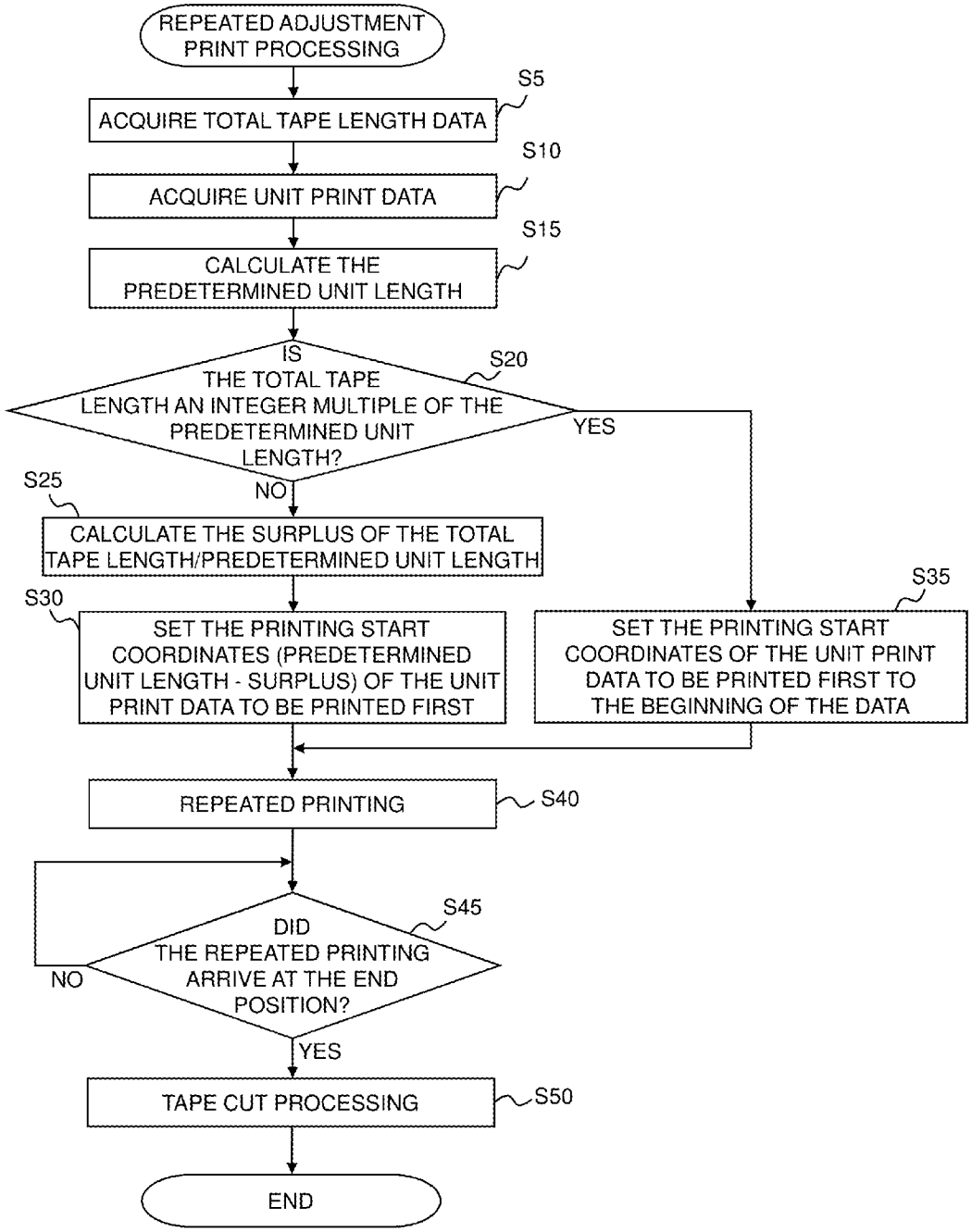
FIG. 17 is a flowchart showing the control contents of the repeated adjustment print processing executed by the CPU of the tape printer.

Next, the control details of the repeated adjustment print processing executed by the CPU 212 of the tape printer 1 will be described using FIG. 17. First, in FIG. 17, the flow is started by the user performing an operation that starts the print processing using the print data editing application on the PC 217, for example.

First, in step S5, the CPU 212 acquires the above described total tape length data set by the user as described above from the PC 217 (or from the RAM 213 where the data was stored in advance, or the like).

Subsequently, the flow proceeds to step S10 where the CPU 212 acquires the above described unit print data set by the user as described above from the PC 217 (or from the RAM 213 where the data was stored in advance, or the like).

Subsequently, the flow proceeds to step S15 where the CPU 212 calculates the image length of the unit print data (that is, the predetermined unit length described above) acquired in the above described step S10.

Subsequently, the flow proceeds to step S20 where the CPU 212 determines whether or not the total tape length that is indicated by the total tape length data acquired in the above described step S5 is an integer multiple of the predetermined unit length calculated in the above described step S15. If the total tape length is not an integer multiple of the predetermined unit length, the condition is not satisfied and the flow proceeds to step S25.

In step S25, the CPU 212 calculates the above described surplus length D that results when the above described total tape length is divided by the above described predetermined unit length.

Subsequently, the flow proceeds to step S30 where the CPU 212 configures settings so that, in the data print area where the repeated print image is formed in the first sequence, the dot pattern data of the dot coordinate position and thereafter that is on the downstream side from the dot coordinate position of the transport direction beginning of the unit print data by an amount equivalent to the above described phase delay value ΔL is used (in other words, so that the printing start dot coordinates are the "predetermined unit length - surplus length D"). Subsequently, the flow proceeds to step S40 described later.

On the other hand, in a case where the above described step S20 determines that the total tape length is an integer multiple of the predetermined unit length, the conditions of step S20 are satisfied and the flow proceeds to step S35.

In step S35, the CPU 212 configures settings so that, in the data print area where the repeated print image is formed in the first sequence, the dot pattern data from the dot coordinate position of the transport direction beginning of the unit print data is used (in other words, so that the printing start dot coordinates are the beginning of the data). Subsequently, the flow proceeds to step S40.

In step S40, the CPU 212 controls the driving of the above described feeding motor M1, the adhesive take-up motor M2, and the separation sheet take-up motor M3 via the above described motor driving circuits 218, 219, 220 to feed the print-receiving tape 150 and the tapes 150', 150" with print, and controls the conduction of the heating elements of the print head 11 via the print head control circuit 221. With this arrangement, formation of the repeated print image (that is, repeated printing) is executed in the respective data print areas in correspondence with the settings in the above described step S30 or the above described step S35.

Subsequently, the flow proceeds to step S45 where the CPU 212 determines (by a known technique) whether or not the above described repeated printing has been performed in an amount equivalent to the total tape length indicated by the total tape length data acquired in step S5 and has arrived at the end position of the printed matter print area. Until the repeated printing arrives at the end position, the repeated printing is continued and the apparatus enters a loop standby state. Once the repeated printing arrives at the end position, the condition of step S45 is satisfied and the flow proceeds to step S50.

In step S50, the CPU 212 performs tape cut processing. That is, the CPU 212 controls the driving of the above described feeding motor M1, adhesive take-up motor M2, and separation sheet take-up motor M3 via the above described motor driving circuits 218, 219, 220, and stops the feeding of the above described print-receiving tape 150 and tapes 150', 150" with print. Further, the CPU 212 stops the conduction of the heating elements of the print head 11 via the print head control circuit 221. With this arrangement, execution of the formation of the above described repeated print image (that is, repeated printing) ends. Furthermore, the CPU 212 controls the driving of the cutter motor M4 via the motor driving circuit 222, thereby cutting the tape 150" with print by the movable blade 32 of the cutter mechanism 30 at the end of the above described printed matter print area. Note that, after this cutting, the CPU 212 drives the above described adhesive take-up motor M2 via the above described motor driving circuit 219, winding the tape 150" with print on the outer circumference side of the take-up mechanism 40 to form the second roll R2. This flow then terminates here.

Advantages of This Embodiment

As described above, in the tape printer 1 in this embodiment, the unit print data of the predetermined unit length and the total tape length data equivalent to the tape length are acquired by the procedures of steps S5, S20. Then, by the procedures of steps S25, S30, S35, adjustments are made so as to match the end position of the above described printed matter print area and the end position of the data print area where the repeated print image is formed in the last sequence. The print data mode adjustment performed by the procedures of steps S25, S30, S35 at this time is a technique that fixes the total length data and adjusts the print mode based on the unit print data in the printed matter print area.

With this arrangement, it is possible to form the entire repeated print image in the end section of the produced tape 150" with print without cutting off the image. As a result, even in a case where the printed tape 150" with print is wound into a roll shape, the aesthetics of the tape end positioned on the outer circumference improve (refer to FIG. 16B).

Figure 18:
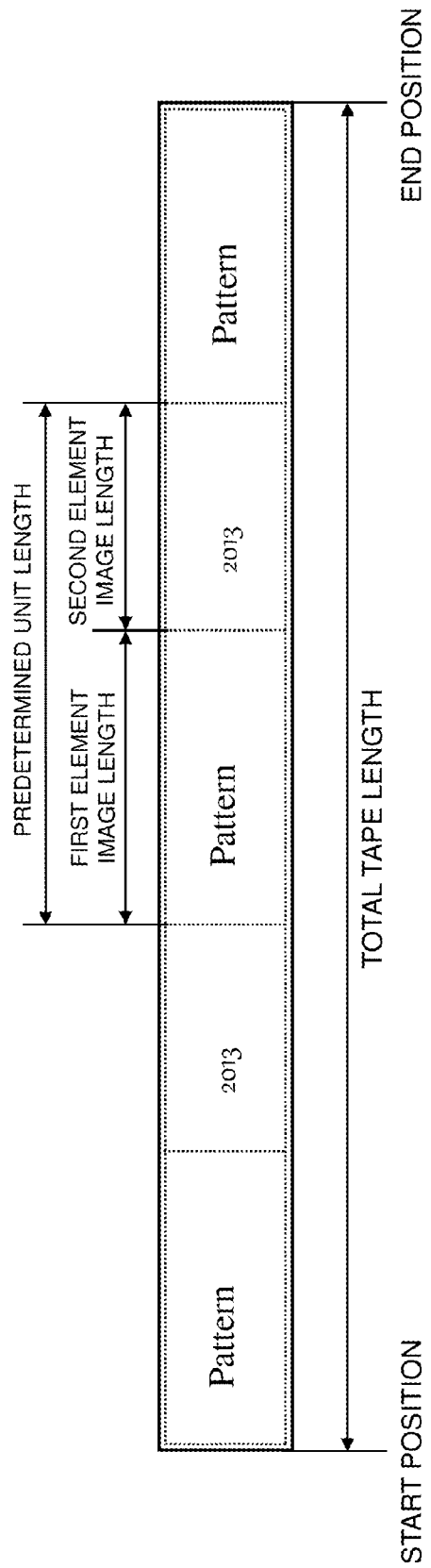
FIG. 18 is a diagram showing the phase adjustment in a case where the unit print data is configured by two sets of element print data.

Note that, even in a case where the unit print data comprises a plurality of sets of element print data, the print data mode adjustment by phase adjustment in this embodiment is applicable. For example, as shown in FIG. 18, consider a case where the unit print data comprises two sets of element print data including a first element print data "Pattern" and a second element print data "2013." At this time, the print data area with the above described predetermined unit length comprises a first print data area with a first element image length corresponding to "Pattern," and a second print data area with a second element image length corresponding to "2013." In this case, similar to the above described embodiment, the combination of the two sets of element print data is regarded and treated as one set of unit print data, and print data mode adjustment by phase adjustment needs only to be performed in the period of the above described predetermined unit length. At this time, the end position of the printed matter print area may be made to match the end position of the data print area in the combination unit of the above described two sets of element print data (in the unit of the above described one set of unit print data), or made to match the end position of the data print area of each element print data unit. That is, in the example of FIG. 18, the above described surplus length D that results when the total length (total tape length) of the printed matter print area is divided by the above described predetermined unit length matches the length of the first data print area (first element image length) of the first element print data "Pattern" of the above described unit print data (the combination of the first element print data "Pattern" and the second element print data "2013"). Hence, in this case, the phase of the above described periodic disposition is adjusted so that the start position of the data print area of the first element print data "Pattern" is made to match the start position of the printed matter print area. With this arrangement, it is possible to form the entire repeated print image corresponding to the first element print data "Pattern" (the entire image of the "Pattern" text) in the end section of the produced tape 150" with print without cutting off the image.

Further, as shown in FIG. 19, even in a case where the unit print data comprises three or more (five in the example shown) sets of element print data, the print data mode adjustment by phase adjustment in this embodiment described above is applicable. In the example shown, the five sets of element print data, in the order of the first element print data "A," the second element print data "B," the third element print data "C," the fourth element print data "D," and the fifth element print data "E," are disposed, constituting one set of the above described unit print data as a whole. Hence, in the example shown in FIG. 19A, the surplus length D matches the combined length of a length Lb of the second data print area corresponding to the second element print data "B," and a length Lc of the third data print area corresponding to the third element print data "C." In this case, as described above, the corresponding repeated images are not each formed in the order of the first element print data "A," the second element print data "B," the third element print data "C," the fourth element print data "D," and the fifth element print data "E." That is, as shown in FIG. 19B, the phase is adjusted so that the corresponding repeated images are each formed in an order first starting from the second element print data "B" and the third element print data "C" (in other words, in the order of the second element print data "B," the third element print data "C," the fourth element print data "D," the fifth element print data "E," and the first element print data "A").

Specifically, the phase of the above described periodic disposition may be adjusted so that the start position of the data print areas of the second element print data "B" and the third element print data "C" (that is, the starting dot coordinate position of the initial second element print data "B") is made to match the start position of the printed matter print area. With this arrangement, it is possible to match the end position of the printed matter print area with the end position of the data print area in each element print data unit while maintaining a disposition order (hereinafter suitably referred to as a "circulating order") such as the first element print data "A" before the second element print data "B," the second element print data "B" before the third element print data "C," the third element print data "C" before the fourth element print data "D," and the fourth element print data "D" before the fifth element print data "E." Note that while the above has described an illustrative scenario in which the surplus length D matches the combined length of the length Lb of the second data print area corresponding to the second element print data "B," and the length Lc of the third data print area corresponding to the third element print data "C," the present disclosure is not limited thereto. That is, for example, in a case where the above described surplus length D matches the length of the data print area corresponding to one set of element print data such as the third element print data "C," the same technique as described above may be applied. Or, for example, in a case where the above described surplus length D matches the total of the length of the fourth data print area corresponding to the fourth element print data "D," the length of the fifth data print area corresponding to the fifth element print data "E," the length of the first data print area corresponding to the first element print data "A," and the length of the second data print area corresponding to the second element print data "B," that is, the total of the lengths of the data print areas of three or more sets of element print data following the above described circulating order, the same technique as described above may be applied.

Note that the present disclosure is not limited to the above, and various modifications may be made according without deviating from the spirit and scope of the disclosure. The following describes such various modifications one by one. Note that components identical to those in the above described embodiment are denoted using the same reference numerals, and descriptions thereof will be omitted or simplified as appropriate.

Print Data Mode Adjustment 2: Period Adjustment

As described above, in the repeated printing, a repeated image based on unit print data is periodically formed in a plurality in the printed matter print area. Accordingly, it is possible to match the end positions by adjusting the period when the plurality of repeated images is formed as well. Specifically, as shown in FIG. 20, repeated printing is executed by dividing the above described surplus length D by the value that results when 1 is subtracted from the number of repeated images that can be formed in the length of the printed matter print area (in other words, the total tape length) (in other words, the number of the above described predetermined unit lengths that can be disposed in the printed matter print area; four in the example shown) (D/3 in the example shown), and inserting a spacing of this length between two adjacent repeated images. That is, for all remaining unit print data excluding the unit print data by which the repeated image is formed in the last sequence, the period during repeated image formation is uniformly adjusted so that it is longer (the period is set to the value that results when a spacing of D/3 is added to the above described predetermined unit length). This, in particular, is effective in a case where the surplus length D is plenty short compared to the predetermined unit length as in the example shown, or in a case where there are many repeated images to be formed in the printed matter print area. Note that, in a case where the repeated print image based on the unit print data is text made of a plurality of characters such as shown and the period is adjusted by the above described technique, the character spacing and character width of the text, and the horizontal width of the entire repeated print image may also be adjusted as well.

Total Length Data Adjustment 1: Setting the Total Tape Length Using a Multiple of the Predetermined Unit Length While the above has described a print data mode adjustment technique that fixes the total length data and adjusts the print mode based on the unit print data in the printed matter print area, the present disclosure is not limited thereto. That is, adjustment of the above described end position may be performed by a total length data adjustment technique that fixes the above described phase and the above described predetermined unit length and adjusts the above described total length data.

Figure 21:
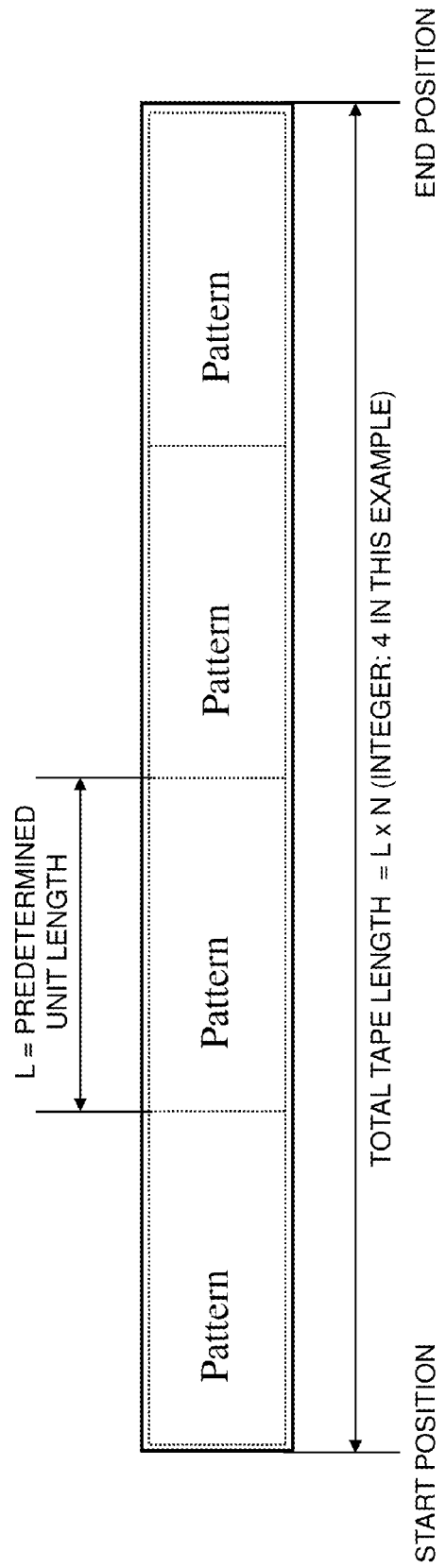
FIG. 21 is a diagram showing total length data adjustment that sets the total tape length using an integer multiple of the predetermined unit length.

For example, as shown in FIG. 21, when the user sets the total length data as described above, the total length data can be set using a multiple (4× in the example shown) of the above described predetermined unit length only. Specifically, the technique may be such that, when the user sets the total tape length after first setting the unit print data and the predetermined unit length thereof using the print data editing application on the PC 217, the user performs the input setting using an integer multiple of the predetermined unit length. With this arrangement, the above described total tape length is reliably set as an integer multiple of the above described predetermined unit length, making it possible to match the end position of the printed matter print area and the end position of the data print area where the repeated image is formed in the last sequence.

Figure 22:
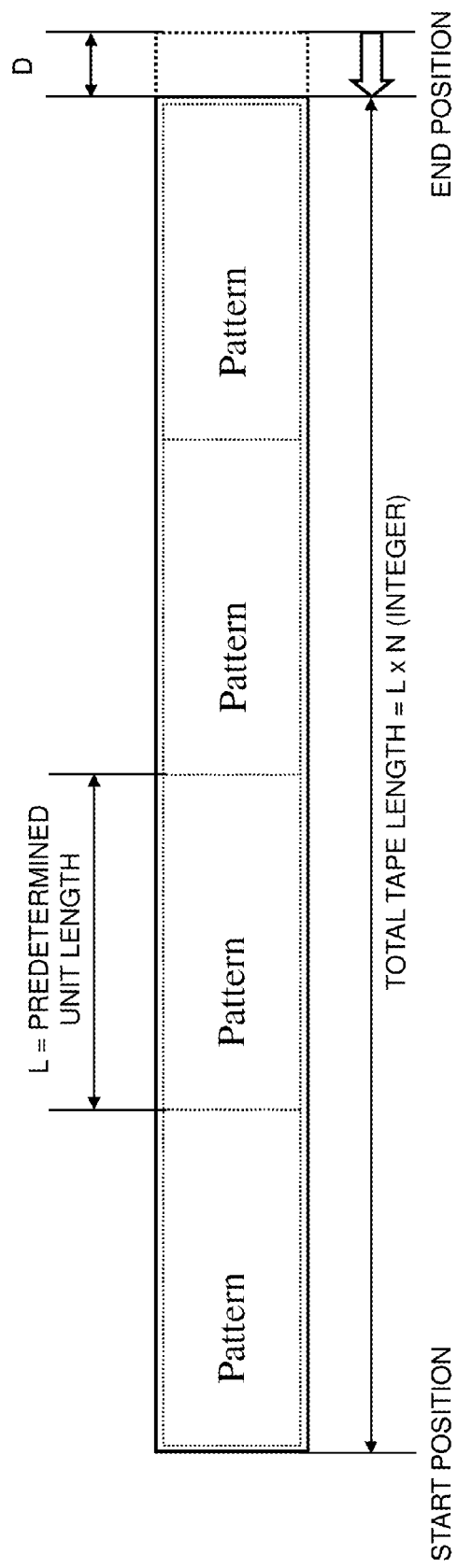
FIG. 22 is a diagram showing the total length data adjustment that adjusts the total tape length so that the total tape length is made into an integer multiple of the predetermined unit length.

Total Length Data Adjustment 2: Adjusting the Total Tape Length by Making the Value an Integer Multiple of the Predetermined Unit Length As another total length data adjustment, in a case where the multiplication factor of the set total length data with respect to the predetermined unit length is not an integer multiple (in a case where the value is greater than 4 and less than 4.5 in the example shown), the total length data may be adjusted so that the multiplication factor is rounded off to the nearest integer multiple (to 4× in the example shown), as shown in FIG. 22. In the example shown, the above described surplus length D is discarded, thereby achieving an integer multiple (4×). In this case as well, the final above described total tape length is set as an integer multiple of the above described predetermined unit length, making it possible to match the end position of the printed matter print area and the end position of the data print area where the repeated image is formed in the last sequence.

In a Case Where a Stand-Alone Configuration is Used

Figure 23:
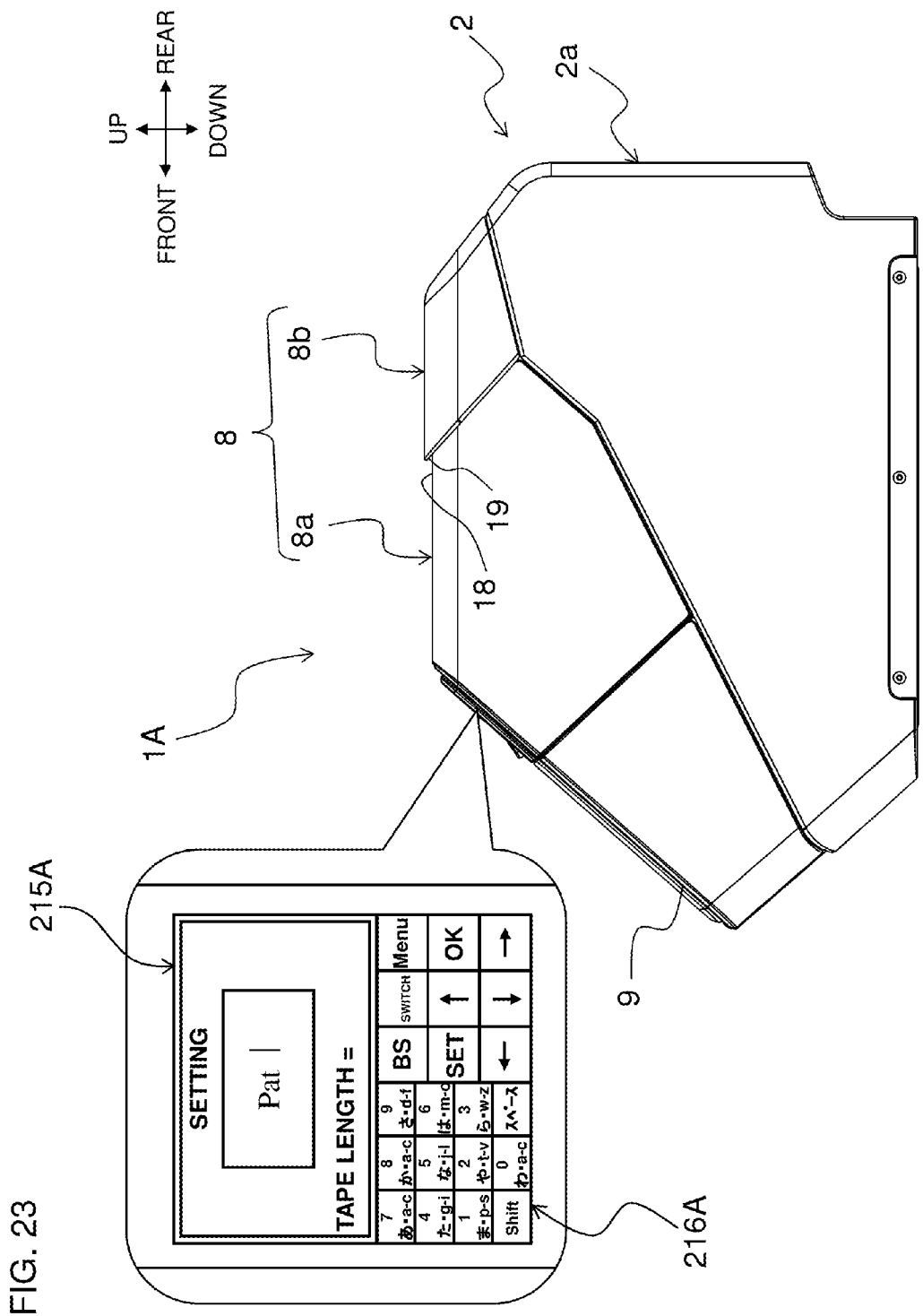
FIG. 23 is a right side view showing the outer appearance of a tape printer with a stand-alone configuration.
Figure 24:
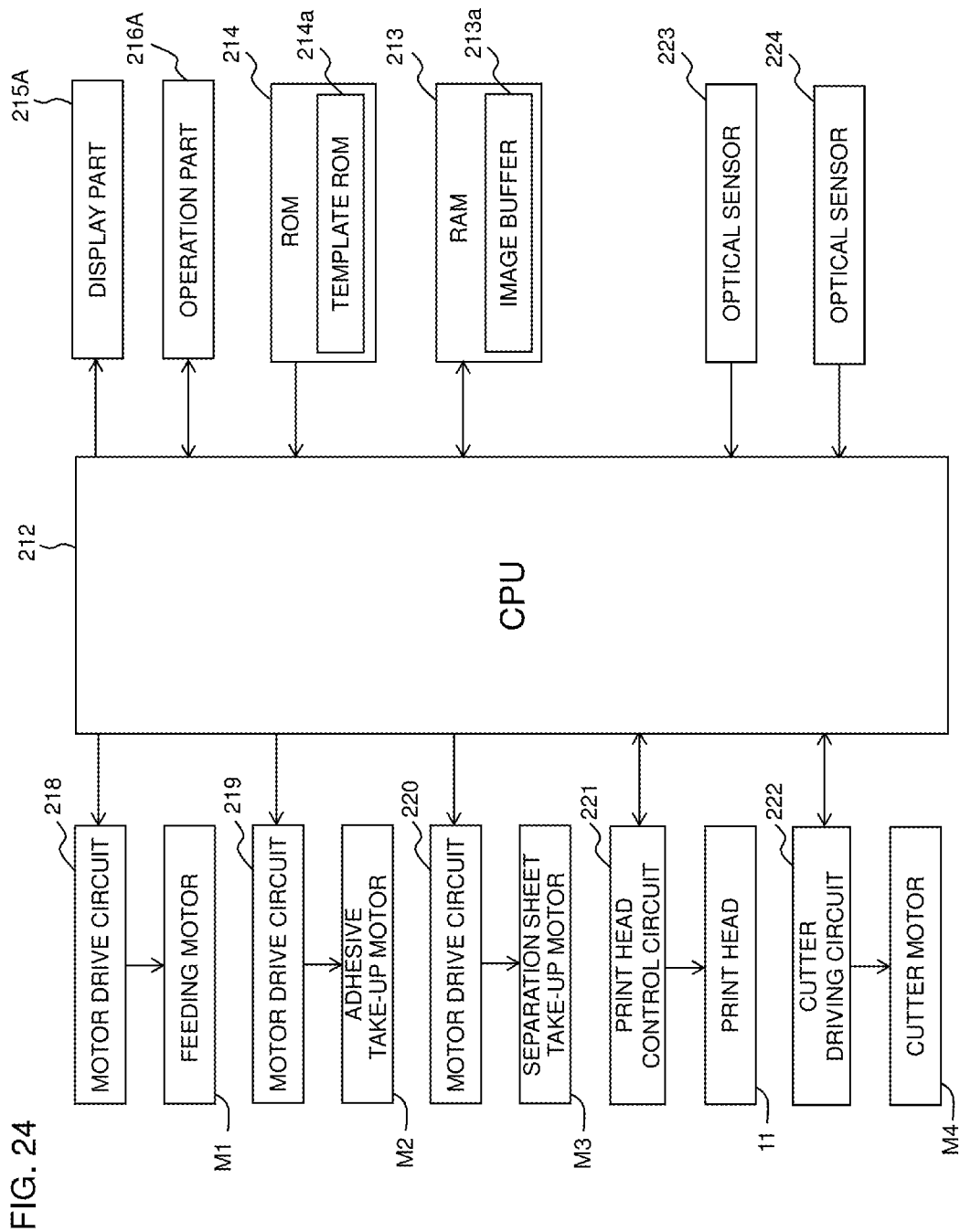
FIG. 24 is a block diagram showing the configuration of the control system of a tape printer with a stand-along configuration.

While the above described embodiment has described a case where the PC 217 serving as the operation terminal and the tape printer 1 are connected by a network, the present disclosure is not limited thereto. That is, as shown in FIG. 23 corresponding to the above described FIG. 1, the configuration may be one where a tape printer 1A also has the function of the above described operation terminal (a so-called stand-alone type). In this case, the generation of the above described unit print data and the setting of the total tape length are performed based on a user operation using a display part 215A and an operation part 216A of the tape printer 1A. Further, as necessary, a template ROM 214a that stores template data applicable when the above described unit print data is to be produced is stored inside the ROM 214 as shown in FIG. 24 corresponding to the above described FIG. 13. With this arrangement, the generation of the above described unit print data and the setting of the above described total tape length can be performed by the tape printer 1A only without connection to the external PC 217.

Further, other than that already stated above, techniques based on the above described embodiments and each of the modifications may be suitably utilized in combination as well.

What is claimed is:

1. A recorded matter producing apparatus comprising:
a feeder configured to feed a medium to be recorded;
a printing head configured to perform printing on said medium fed by said feeder based on print data and produce recorded matter where desired printing based on said print data is formed on said medium along a transport direction of said feeder;
a data acquisition portion configured to acquire unit print data for periodically performing print formation per data print area of said medium and total length data, the data print area comprising a predetermined unit length along said transport direction, the total length data indicating a total length of a recorded matter print area of said recorded matter on which a unit image corresponding to said unit print data is periodically printed along said transport direction; and
an end adjusting portion configured to make adjustments so as to match an end position of said recorded matter print area along said transport direction and an end position of said data print area where said unit image is formed in a last sequence along said transport direction, by either print data mode adjustment that fixes said total length data and adjusts a print mode by said unit print data in said recorded matter print area, or total length data adjustment that fixes said predetermined unit length and adjusts said total length data.

2. The recorded matter producing apparatus according to claim 1, wherein:
said data acquisition portion acquires said unit print data including contents that is set so as to be desired by an operator, and said total length data including length that is set so as to be desired by said operator.

3. The recorded matter producing apparatus according to claim 1, further comprising:
a print control portion configured to control said printing head so that a plurality of said unit images is formed in said recorded matter print area by periodically forming said unit image per said data print area of said medium.

4. The recorded matter producing apparatus according to claim 3, further comprising:
a cutting device configured to cut said recorded matter at a rear end of said recorded matter print area along said transport direction.

5. The recorded matter producing apparatus according to claim 4, further comprising:
a taking-up device configured to sequentially take up said recorded matter cut at the rear end of said recorded matter print area and form a roll-shaped recorded matter comprising a predetermined axis.

6. The recorded matter producing apparatus according to claim 1, wherein:
said end adjusting portion adjusts a phase of a periodic disposition of said unit image in said recorded matter print area as said print data mode adjustment.

7. The recorded matter producing apparatus according to claim 6, wherein:
said end adjusting portion, as said print data mode adjustment, uses a dot pattern of a dot coordinate position that is on a downstream side of a dot coordinate position in a transport direction of a beginning of said unit print data by an amount equivalent to a surplus length that is a remainder when a total length of said recorded matter print area is divided by said predetermined unit length, in a first data print area where said unit image is formed in a first sequence along said transport direction, and uses the dot pattern from the dot coordinate position of the beginning of said unit print data in each of a plurality of second data print areas following said first data print area along said transport direction.

8. The recorded matter producing apparatus according to claim 6, wherein:
in a case where said unit print data consists of a plurality of sets of element print data continuously disposed in a predetermined order and a surplus length that is the remainder when the total length of said recorded matter print area is divided by said predetermined unit length matches a length of a data print area of at least one or more sets of the element print data in an arrangement that continues in said predetermined order among said unit print data, said end adjusting portion adjusts the phase of the periodic disposition of said unit image in said recorded matter print area so as to match a start position of the data print area of the at least one or more sets of the element print data in the arrangement that continue in said predetermined order with a start position of said recorded matter print area, as said print data mode adjustment.

9. The recorded matter producing apparatus according to claim 1, wherein:
said end adjusting portion adjusts a period of a periodic disposition of said unit image in said recorded matter print area, as said print data mode adjustment.

10. The recorded matter producing apparatus according to claim 9, wherein:
said end adjusting portion adjusts, as said print data mode adjustment, the period of the periodic disposition of said unit image by means of dividing a surplus length, that is the remainder when the total length of said recorded matter print area is divided by said predetermined unit length, by a value that results when 1 is subtracted from a value that results when the total length of said recorded matter print area is divided by said predetermined unit length, and of inserting a length equivalent to a division result between two adjacent said unit images.

11. The recorded matter producing apparatus according to claim 1, wherein:
said end adjusting portion makes adjustments so that said total length data is an integer multiple of said predetermined unit length, as said total length data adjustment.

12. The recorded matter producing apparatus according to claim 11, wherein:
said end adjusting portion adjusts said total length data so that a multiplication factor of said total length data with respect to said predetermined unit length is a value of said integer multiple set by an operator, as said total length data adjustment.

13. The recorded matter producing apparatus according to claim 11, wherein:

in a case where a multiplication factor of said total length data with respect to said predetermined unit length is not an integer multiple, said end adjusting portion adjusts said total length data so that said multiplication factor is rounded off to a nearest integer multiple, as said total length data adjustment.

\* \* \* \* \*